US010585316B2

United States Patent
Junge et al.

(10) Patent No.: US 10,585,316 B2
(45) Date of Patent: Mar. 10, 2020

(54) OPTICAL SWITCHING LAYER FOR USE IN AN OPTICAL SWITCHING ELEMENT

(71) Applicant: MERCK PATENT GMBH, Darmstadt (DE)

(72) Inventors: Michael Junge, Pfungstadt (DE); Andreas Beyer, Hanau (DE); Ties De Jong, EN Utrecht (NL)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/570,015

(22) PCT Filed: Apr. 1, 2016

(86) PCT No.: PCT/EP2016/000546
§ 371 (c)(1),
(2) Date: Oct. 27, 2017

(87) PCT Pub. No.: WO2016/173693
PCT Pub. Date: Nov. 3, 2016

(65) Prior Publication Data
US 2018/0157088 A1    Jun. 7, 2018

(30) Foreign Application Priority Data

Apr. 27, 2015 (EP) .................................. 15001239

(51) Int. Cl.
*G02F 1/1347* (2006.01)
*C09K 19/60* (2006.01)
(Continued)

(52) U.S. Cl.
CPC ...... *G02F 1/13476* (2013.01); *C09K 19/3497* (2013.01); *C09K 19/544* (2013.01);
(Continued)

(58) Field of Classification Search
CPC .. G02F 1/13476; G02F 1/1334; G02F 1/1336; G02F 1/13439; G02F 1/137;
(Continued)

(56) References Cited

U.S. PATENT DOCUMENTS

| 5,570,210 A | 10/1996 | Yoshida | |
|---|---|---|---|
| 2012/0307341 A1* | 12/2012 | Higuchi | C07D 213/22 359/275 |
| 2014/0320776 A1* | 10/2014 | Taheri | C09K 19/586 349/16 |

FOREIGN PATENT DOCUMENTS

WO      2000060407 A1    10/2000

OTHER PUBLICATIONS

International Search Report PCT/EP2016/000546 dated Sep. 22, 2016.
(Continued)

*Primary Examiner* — Nathanael R Briggs
*Assistant Examiner* — William D Peterson
(74) *Attorney, Agent, or Firm* — Millen White Zelano and Branigan, PC; Csaba Henter

(57) ABSTRACT

The present invention presents a switching layer S for use in a switching element which has forwards-scattering properties in at least one switching state. Furthermore, a switching element which comprises the switching layer S and a window element which includes the switching element are presented.

22 Claims, 6 Drawing Sheets

(51) Int. Cl.
  *C09K 19/34*      (2006.01)
  *C09K 19/54*      (2006.01)
  *G02F 1/1334*     (2006.01)
  *G02F 1/13357*    (2006.01)
  *G02F 1/1343*     (2006.01)
  *G02F 1/137*      (2006.01)
  C09K 19/12        (2006.01)
  C09K 19/18        (2006.01)
  C09K 19/30        (2006.01)
  C09K 19/04        (2006.01)

(52) U.S. Cl.
  CPC ............ *C09K 19/60* (2013.01); *C09K 19/601* (2013.01); *G02F 1/137* (2013.01); *G02F 1/1334* (2013.01); *G02F 1/1336* (2013.01); *G02F 1/13439* (2013.01); *C09K 2019/0448* (2013.01); *C09K 2019/122* (2013.01); *C09K 2019/123* (2013.01); *C09K 2019/181* (2013.01); *C09K 2019/183* (2013.01); *C09K 2019/3009* (2013.01); *C09K 2019/3016* (2013.01); *C09K 2019/3019* (2013.01); *C09K 2019/3021* (2013.01); *C09K 2019/3063* (2013.01); *C09K 2019/3075* (2013.01); *C09K 2019/3077* (2013.01); *C09K 2219/13* (2013.01); *G02F 2001/13345* (2013.01); *G02F 2001/13756* (2013.01)

(58) Field of Classification Search
  CPC . G02F 2001/13756; G02F 2001/13345; C09K 2019/0448; C09K 19/3497; C09K 2019/123; C09K 2019/181; C09K 2019/3077; C09K 2019/3019; C09K 2019/3009; C09K 2019/3075; C09K 2019/122; C09K 2019/3021; C09K 2019/183; C09K 2019/3063; C09K 2019/3016; C09K 19/60; C09K 19/601; C09K 19/544; C09K 2219/13
  USPC .......................................................... 349/41
  See application file for complete search history.

(56) References Cited

OTHER PUBLICATIONS

Macrelli Guglielmo: "Optical Characterization of Commercial Large Area Liquid Crystal Devices", Solar Energy Materials and Solar Cells, Elsevier Science Publishers, Amsterdam, NL, vol. 39, No. 2/04, Dec. 1995 (Dec. 1, 1995), pp. 123-131, XP000586150, ISSN: 0927-0248.

Kitzerow H-S: "Polymer-Dispersed Liquid Crystals From the Nematic Curvilinear Aligned Phase to Ferroelectric Films", Liquid Crystals, Taylor & Francis, vol. 16, No. 1, Jan. 1994 (Jan. 1, 1994), pp. 1-31, XP000418459, ISSN: 0267-8292.

* cited by examiner (M-1)

(M-2)

(M-1-1)

(M-2-1)

OPTICAL SWITCHING LAYER FOR USE IN AN OPTICAL SWITCHING ELEMENT

The present invention relates to a switching layer for use in a switching element, to a switching element which comprises the switching layer, and to a window element which includes the switching element.

WO 2014/180525 A1 describes a window comprising a device for regulation of the passage of energy through an area, where the device comprises at least two switching layers S(1) and S(2), each of which comprises a liquid-crystalline medium comprising one or more dichroic compounds, and where the device comprises orientation layers O(1), O(2), O(3) and O(4), where the said switching layers and orientation layers are present in the device in planes which are parallel to one another, in the sequence O(1), S(1), O(2), O(3), S(2), O(4), where an orientation axis OA(1)* of the molecules of the liquid-crystalline medium of S(1) which are adjacent to O(2) is present in at least one switching state of the device, and an orientation axis OA(2)* of the molecules of the liquid-crystalline medium of S(2) which are adjacent to O(3) is present, and the orientation axes OA(1)* and OA(2)* are not parallel and are parallel to the plane of the switching layers.

Applied Physics Letters, Volume 74, No. 26 (1999), on pages 3945 to 3947, describes a process for the production of a switching layer, in which 30% by weight of a nematic liquid-crystal mixture available from Merck under the name ZLI-4488-000 are mixed with 70% by weight of an aliphatic urethane diacrylate available from Cray Valley-Total under the name CN965 in a cell with a thickness of about 30 μm. About 1% by weight of a photoinitiator available from Ciba-Geigy under the name Irgacure 651 is added to the mixture, giving a photopolymerisable mixture, which is exposed to UV irradiation by means of a mercury lamp for 10 minutes, with said mixture being placed in a magnetic field having a field strength of 7 T. A switching layer is obtained which reaches the state of maximum achievable opacity beginning from about 60 volts.

A switching layer in accordance with one of the embodiments described above can be integrated into a switching element. The switching element can be installed in a window element, i.e. in the light-transmitting component of a window. A window element which includes a switching element comprising one of the switching layers described above can be switched between the "light" and "dark" states, so that, in the "dark" switching state, shading of a room which contains the window element as light-transmitting component of the window(s) in its outer wall is achieved, where the extent of shading can be regulated by a voltage applied to the switching element.

However, the sunlight entering a room through the window element in the "dark" switching state is also perceived as unpleasant by many people, since they still feel dazzled even by the "dark" sunlight. Although, in order to avoid being dazzled any longer, they can switch the switching element into ever "darker" switching states, until finally a "dark" switching state is achieved which is no longer perceived as dazzling, it is furthermore observed that people are sensitive to dazzling by sunlight to different extents. If a switching state which is adequately "dark" for everyone is then ultimately achieved, the room shaded in such a manner is often so dark that working is at least made more difficult, if not totally impossible. Consequently, one is forced to restore the brightness necessary for working by means of artificial lighting, which, however, is undesired from an energetic point of view.

The present invention thus has the object of providing a window element having a switching element by means of which, in addition to regulation by means of light/dark states, it becomes possible to be able to regulate dazzling by sunlight individually in a room, without being forced to effect the brightness necessary in the room by means of artificial lighting.

A further object is to provide a switching layer for use in a switching element which facilitates switching from a transparent state into a opaque state of the switching element. The opaque state here is a state in which the light passing through the switching element is scattered. The opaque switching state here causes one or more effects selected from reduction of dazzling, as mentioned above, and establishment of privacy.

This object is achieved by a switching layer S for use in a switching element, where the switching layer S has switching states and comprises an upper switching layer plane USLP and a lower switching layer plane LSLP, and, arranged between USLP and LSLP, a liquid-crystalline medium, where, in one of the switching states, parallel light rays which hit the upper switching layer plane USLP in the directions of incidence D(=) are deflected out of D(=) on passing through the switching layer S, so that, after leaving the lower switching layer plane LSLP, the originally parallel light rays are scattered in the forwards-scattering directions D(<) away from the lower switching layer plane LSLP and are thus scattered forwards, resulting in forwards scattering, which is measured as diffusive transmission $T_d$, where $T_d$ is >20%, and where $T_d$ is defined in accordance with formula (1)

$$T_d = (I_{\geq 2.5^\circ} / I_{tot}) \cdot 100 [\%] \qquad (1)$$

in which $I_{\geq 2.5^\circ}$ denotes the intensity of the large-angle scattering with scattering angles ≥2.5° and $I_{tot}$ denotes the intensity of the total transmission.

The value $T_d$ is indicated here averaged over the spectral region from 380 nm to 780 nm. The intensities indicated are determined as indicated in the working examples, and the value $T_d$ is determined as indicated in the working examples.

The switching layer S according to the invention, incorporated into a switching element, allows, in addition to regulation by means of light/dark states, the ability to individually regulate dazzling by sunlight without having to effect the requisite room brightness by means of artificial room lighting. This becomes possible through diffusive transmission of the switching layer S according to the invention in one of the switching states of more than 20%, as a result of which dazzling by the light rays entering the room from the outside through the switching layer is at least significantly reduced and at the same time adequate brightness prevails in the room, so that working without artificial lighting becomes possible during the day. This is perceived as very pleasant by many people and in addition reduces the energy requirement of a building having window elements which include switching elements which comprise the switching layer S according to the invention.

The term "intensity", as used above in the definition of the switching layer S according to the invention, is preferably taken to mean the (light) transmission intensity or simply the (light) transmission through the switching layer in question. Intensity is again preferably taken to mean the intensity of light in the spectral range from 380 nm to 780 nm. Intensity is most preferably taken to mean the numerically averaged transmission in the range from 380 to 780 nm.

The term "switching states" in the sense of the present invention is taken to mean principally binary states in which the switching layer S according to the invention can exist, i.e.

in a switching state in which the switching layer S according to the invention has a diffusive transmission $T_d > 20\%$ and appears homogeneously opaque to the human eye, and in another switching state in which the switching layer S according to the invention has a diffusive transmission $T_d \leq 20\%$ and appears substantially transparent or clear to the human eye.

However, it is also possible for the switching layer according to the invention to have further switching states, in particular intermediate states.

In addition, the switching layer S according to the invention, if it is combined with further switching layers in a switching element, allows switching between a completely private state and a state with viewing contact to the outside. In particular, viewing contact to the outside is a property which is not offered by awnings and blinds.

The term "light rays" in the sense of the present invention is taken to mean, in particular, electromagnetic rays in the UV-A, VIS and NIR region. In particular, it is taken to mean light rays of a wavelength which is not absorbed by the materials usually used in windows (for example glass) or is only absorbed to a negligible extent. In accordance with the definitions usually used, the UV-A region is taken to mean a wavelength of 320 nm to 380 nm, the VIS region is taken to mean a wavelength of 380 nm to 780 nm and the NIR region is taken to mean a wavelength of 780 nm to 2000 nm.

The term "liquid-crystalline medium" in the sense of the present invention is taken to mean a material which has liquid-crystalline properties under certain conditions. The liquid-crystalline medium in accordance with the invention typically comprises at least one compound whose molecules have an elongate shape, i.e. are significantly longer in one spatial direction (longitudinal axis) than in the other two spatial directions.

The liquid-crystalline medium of the switching layer S is forwards-scattering in at least one state of the switching layer.

In preferred embodiments, the switching layer S according to the invention has, in one of the switching states, a diffusive transmission $T_d > 25\%$, particularly preferably $T_d > 30\%$, very particularly preferably $T_d > 35\%$, and most preferably $T_d > 40\%$.

In a further preferred embodiment, the switching layer S according to the invention has, in another switching state, a diffusive transmission $T_d < 5\%$, where a diffusive transmission $T_d < 3\%$ is particularly preferred.

The scattering switching state preferably occurs at an applied voltage which is smaller than the voltage at which the non-scattering state occurs. In particular, the applied voltage for achieving the scattering switching state is significantly greater than zero, preferably 2-10 V, particularly preferably 3 to 7 volts. The applied voltage for achieving the non-scattering switching state is preferably between 10 and 35 V, particularly preferably between 15 and 30 V. This applies to the embodiment of the switching layer S in which the liquid-crystalline medium comprises a chiral dopant. In the embodiment in which the liquid-crystalline medium comprises a polymer component and nematically arranged small molecules, the non-scattering state preferably occurs, by contrast, without an applied voltage, and the scattering state preferably occurs at voltages in the range from 30 to 300 V, particularly preferably between 40 and 200 V.

In a preferred embodiment of the switching layer S according to the invention, the liquid-crystalline medium comprises nematically arranged molecules and a polymer component, where the polymer component preferably comprises a polymeric network which is obtained by polymerisation of reactive mesogens, and where the reactive mesogens preferably contain at least one group selected from acrylate groups, particularly preferably from monoacrylate groups, diacrylate groups or triacrylate groups, vinyl ether groups and epoxide groups.

The nematically arranged molecules are in this case preferably small molecules in the sense of low-molecular-weight compounds.

Reactive mesogens in accordance with the present invention preferably have a basic structure of the formula (M-1) or (M-2) as illustrated in FIG. 9, where the group C represents a mesogenic group which is bonded to the group S or the groups S. It particularly preferably contains at least one aryl, heteroaryl or cyclohexyl group.

Furthermore, the group S represents any desired spacer group. It can represent a single bond, a single atom or a chain having a length of 2 to 20 atoms. It preferably represents a chain having a length of 2 to 10 atoms, particularly preferably an alkylene, alkyleneoxy or alkylenedioxy group. In delimitation from the mesogenic group, the spacer group represents a flexible group which can freely align and move in all spatial directions, while the mesogenic group typically has restricted mobility.

The group R represents any desired reactive group which is able to polymerise in the polyaddition reaction, preferably an acrylate, vinyl ether or epoxide group, particularly preferably an acrylate group. The index n has a value of 2 to 5, preferably 2 to 4 and particularly preferably 2.

Particular preference is given to reactive mesogens of the formula (M-1) or formula (M-2) which conform to one of the two formulae (M-1-1) or (M-2-1) as illustrated in FIG. 10, where the groups C and S are as defined above and $R^{21}$ represents any desired organic radical, preferably H or an alkyl group having 1 to 10 C atoms, particularly preferably H.

The reactive mesogen is very particularly preferably a diacrylate having the following structural formula:

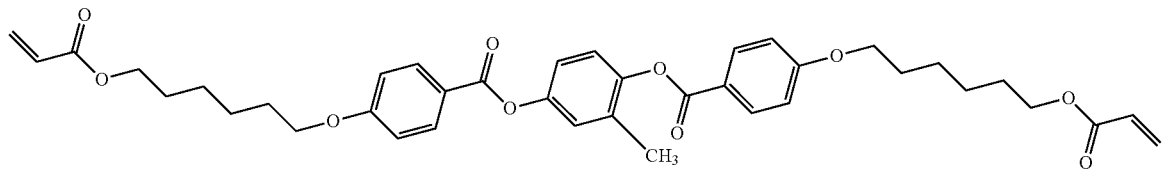 [SMILES: C=CC(=O)OCCCCCCOc1ccc(C(=O)Oc2ccc(OC(=O)c3ccc(OCCCCCCOC(=O)C=C)cc3)c(C)c2)cc1]

which is available from Merck under the name RM82, or a monoacrylate of the following structural formula R#2 or R#3:

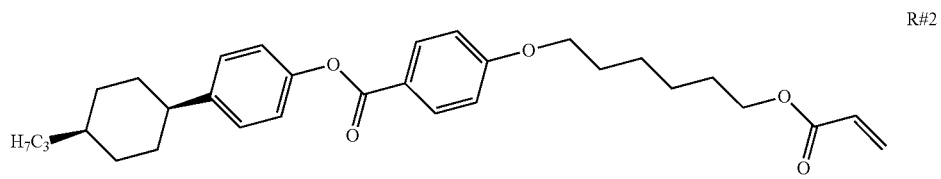
R#2

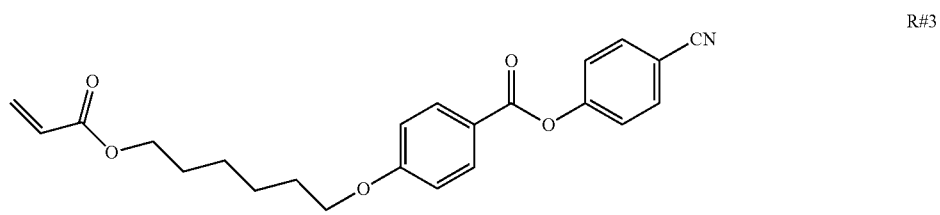
R#3

The nematically arranged molecules and the polymeric network are furthermore preferably homogeneously distributed in one another. This means that, at least visually, no droplet formation of the nematically arranged molecules is observed.

The nematically arranged molecules are preferably employed in the form of a mixture of liquid-crystalline nematic molecules, where the mixture has a refractive index anisotropy Δn and a dielectric anisotropy Δε. The mixture of liquid-crystalline nematic molecules preferably has a refractive index anisotropy Δn in the range from 0.03 to 0.40, particularly preferably in the range from 0.06 to 0.30, and/or a dielectric anisotropy Δε in the range from −50 to +100, particularly preferably in the range from −15 to +70. Preference is given to liquid-crystalline mixtures having a negative dielectric anisotropy Δε, which particularly preferably has a value between −6 and −3. Alternatively, preference is given to liquid-crystalline mixtures having a positive dielectric anisotropy Δε, which particularly preferably has a value between 3 and 50, very particularly preferably a value between 5 and 20.

A mixture of liquid-crystalline nematic molecules which is preferably employed, in particular in combination with the polymers in the switching layer S, is the base mixture #1 mentioned below.

In a preferred embodiment of the switching layer S according to the invention, the nematically arranged molecules have a proportion by weight $w_{LC}$ and the polymeric network has a proportion by weight $w_{PN}$, and $w_{PN}$, based on a weight $w_{LC}+w_{PN}$, is in the region<60% by weight, more preferably in the region<40% by weight and very particularly preferably in the region<30% by weight. The nematically arranged molecules preferably have a proportion by weight $w_{LC}$ in the range from 40% by weight to 98% by weight and the polymeric network has a proportion by weight $w_{PN}$ in the range from 60% by weight to 2% by weight, in each case based on a weight $w_{LC}+w_{PN}$.

As already mentioned, the polymeric network is obtained by polymerisation of a reactive mesogen. To this end, a photoinitiator is preferably employed, particularly preferably a photoinitiator of the following structural formula:

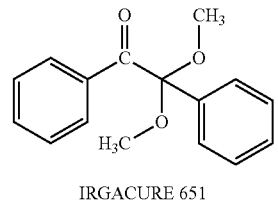 [SMILES: COC(OC)(C(=O)c1ccccc1)c1ccccc1]
IRGACURE 651 which is currently available from BASF under the name Irgacure 651, or photoinitiators whose structures are listed in the following table:

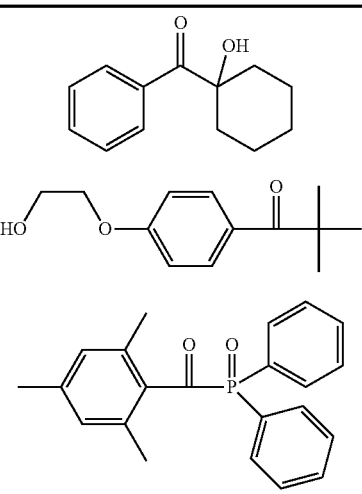

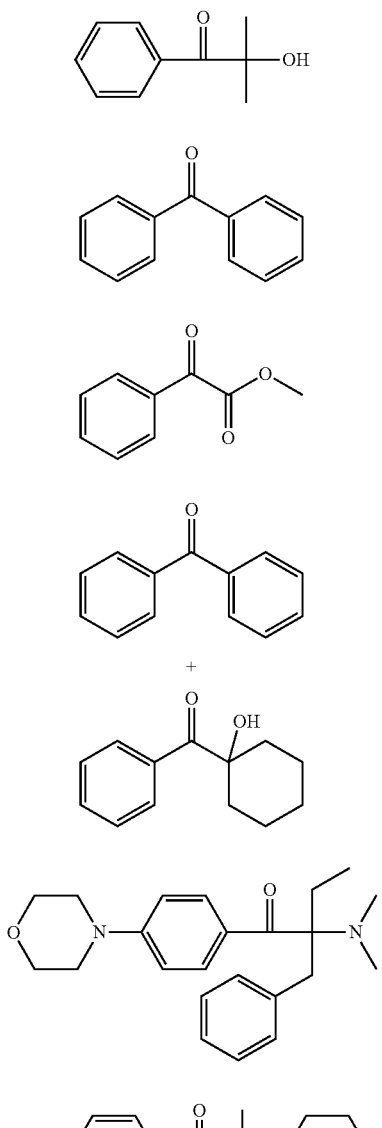

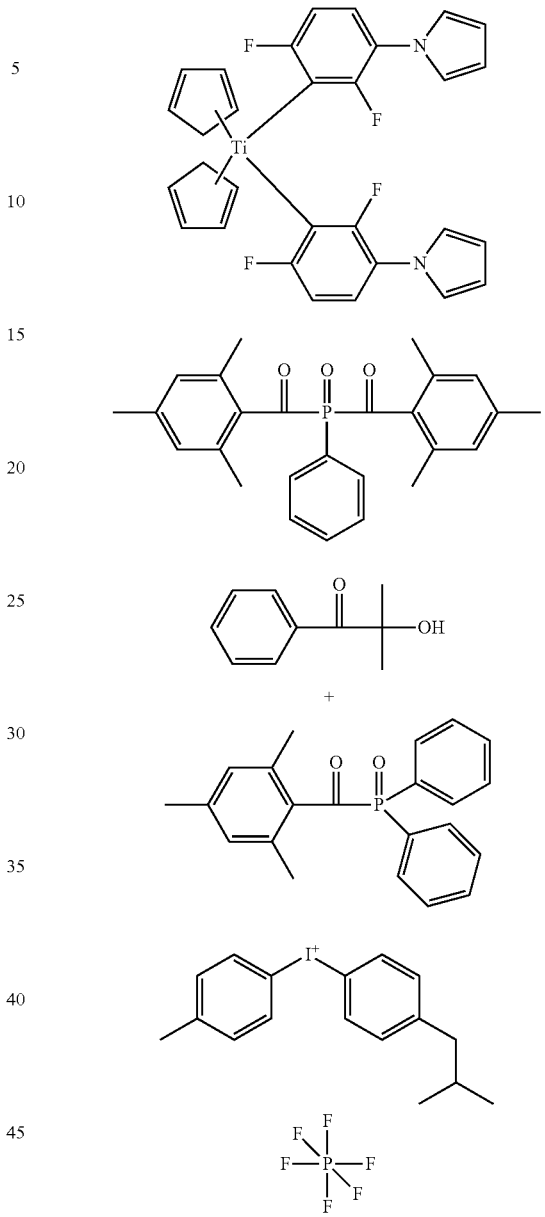

For polymerisation and for subsequent use in the switching layer S according to the invention, the mixture preferably comprises, based on its weight, 60% by weight to 98% by weight of nematically arranged molecules, 40% by weight to 2% by weight of reactive mesogen and 0.01% by weight to 5% by weight of photoinitiator.

The reactive mesogen may consist of a plurality of components, for example of monofunctional and multifunctional reactive mesogens. The multifunctional reactive mesogen components generally ensure crosslinking.

In a further preferred embodiment, a photoinitiator is omitted. The component of the reactive mesogen used is reactive mesogens which are able to initiate the polymerisation themselves by means of light>340 nm. An example in this respect is the mesogen based on the coumarine system which is depicted in the following structural formula:

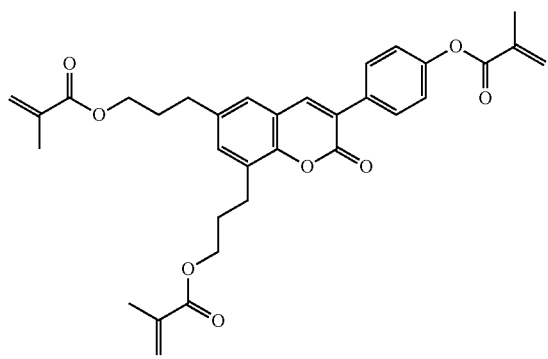 [SMILES: C=C(C)C(=O)OCCCc1cc(CCCOC(=O)C(=C)C)c2oc(=O)c(-c3ccc(OC(=O)C(=C)C)cc3)cc2c1]

In a further preferred embodiment, the switching layer S according to the invention comprises a liquid-crystalline medium which comprises a chiral dopant.

In this embodiment, the molecules of the liquid-crystalline medium are preferably in a chirally nematic phase if the switching layer S is in the switching state where $T_d$>20%, i.e. in the opaque switching state.

In a further preferred embodiment, the chirally nematic phase in one switching state in which $T_d$ is >20% is a phase aligned in polydomains. For the purposes of the present invention, "a phase aligned in polydomains" means a state in which the molecules of the liquid-crystalline medium do not have a uniform orientation axis and do not have a uniform common linear helical axis. The phase aligned in polydomains in the switching layer S has the advantage that it is homogeneous, and is preferably free from visible defects over the entire area. In particular, this is an advantage over phases in which helices occur which are uniformly parallel to the substrate layers, and/or over phases which have so-called strip domains. A further advantage of the phase aligned in polydomains is that it can be achieved with the conventional orientation layers oriented in a planar or homeotropic manner, i.e. that there is no need to fall back on special additional treatments of the orientation layers.

In a further preferred embodiment, the chirally nematic phase in one switching state is at least locally twisted, alternatively also in superordinate macroscopic structure arrangements which can be formed therefrom.

In a further preferred embodiment, the phase in the other switching state is untwisted, i.e. aligned in a homeotropic or planar manner, or it has a low degree of twist. A low degree of twist here is taken to mean a twist of the molecules over the thickness of the layer of 5°-360°, preferably 45°-300°, and particularly preferably 90°, 180° or 270°.

The chiral dopant is preferably homogeneously distributed in the nematic phase, so that the molecules of the liquid-crystalline medium and the chiral dopant are homogeneously distributed in one another.

The chiral dopant is particularly preferably dissolved in the nematic phase.

The chirally nematic phase is preferably employed in the form of a nematic liquid-crystalline mixture, where the mixture has a refractive index anisotropy Δn and a dielectric anisotropy Δε. The mixture preferably has a refractive index anisotropy Δn in the range from 0.03 to 0.40, particularly preferably in the range from 0.07 to 0.30, and/or a dielectric anisotropy Δε in the range from −50 to +100, particularly preferably in the range from −15 to +70. Furthermore, the preferred values indicated above for the dielectric anisotropy Δε apply in this respect.

The liquid-crystalline mixture preferably comprises at least one compound of a component I, at least one compound of a component II, and at least one compound of a component III.

Compounds of component I are selected from bicyclic compounds which contain at least one end group selected from F, CN, alkyl groups having 1 to 10 C atoms, alkenyl groups having 2 to 10 C atoms and alkoxy groups having 1 to 10 C atoms.

Compounds of component II are selected from tricyclic compounds which contain at least one end group selected from F, CN, alkyl groups having 1 to 10 C atoms, alkenyl groups having 2 to 10 C atoms and alkoxy groups having 1 to 10 C atoms.

Compounds of component III are selected from tetracyclic compounds which contain at least one end group selected from F, CN, alkyl groups having 1 to 10 C atoms, alkenyl groups having 2 to 10 C atoms and alkoxy groups having 1 to 10 C atoms.

The proportion of the compounds of components I, II and III in the liquid-crystalline medium together is preferably at least 70% by weight, preferably at least 80% by weight, and particularly preferably at least 85% by weight.

A mixture of liquid-crystalline molecules which is preferably employed is the mixture, referred to by the applicant as base mixture #2, of the molecules depicted below:

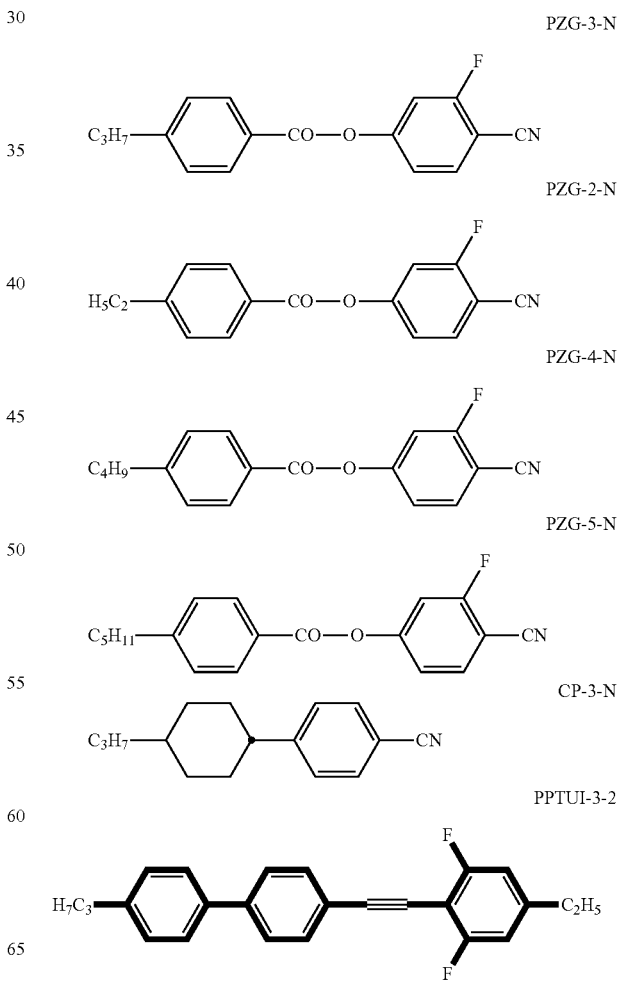

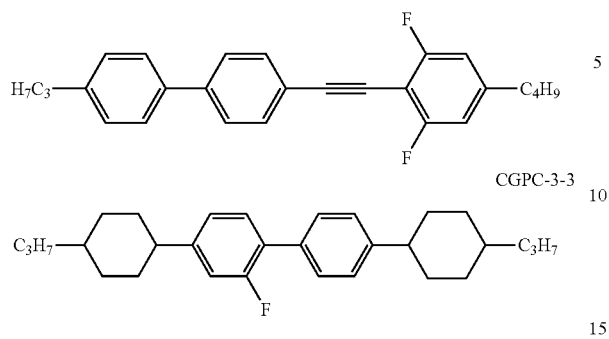

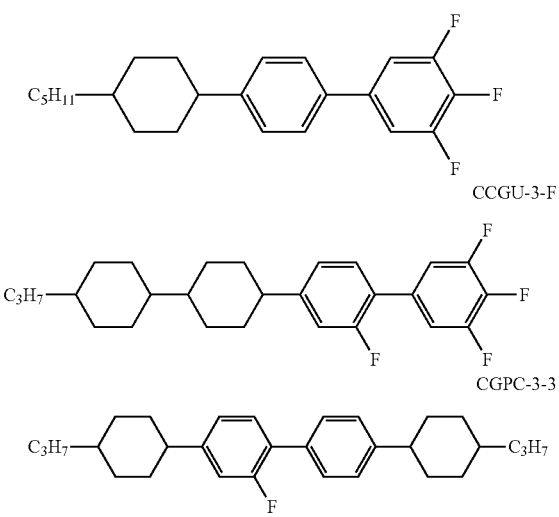

A further mixture of liquid-crystalline molecules which is preferably employed is the mixture, referred to by the applicant as base mixture #3, of the molecules depicted below:

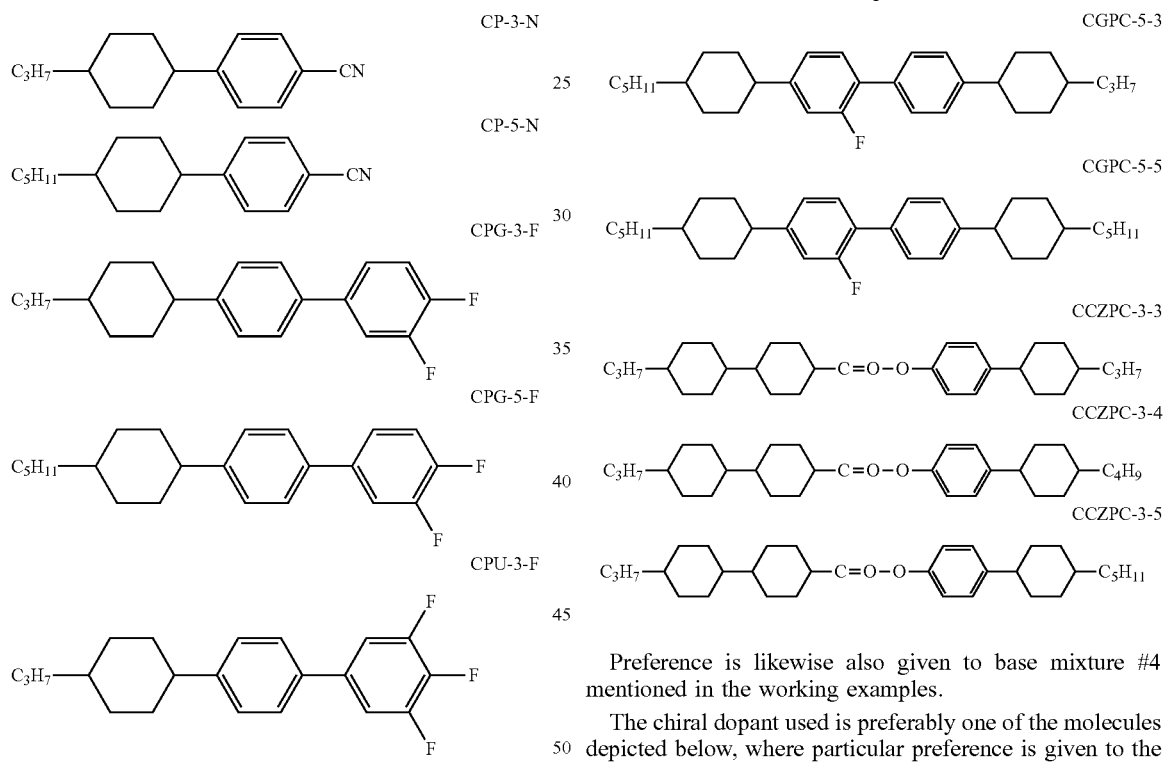

Preference is likewise also given to base mixture #4 mentioned in the working examples.

The chiral dopant used is preferably one of the molecules depicted below, where particular preference is given to the chiral dopants S-5011 or S-811 shown below:

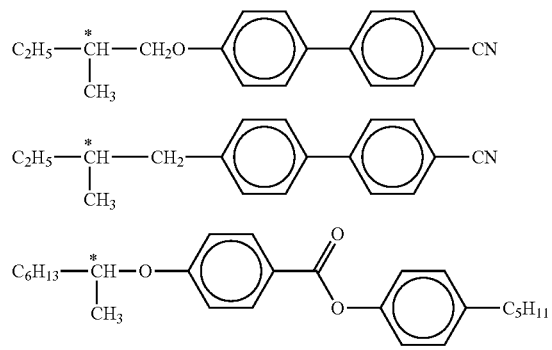

-continued
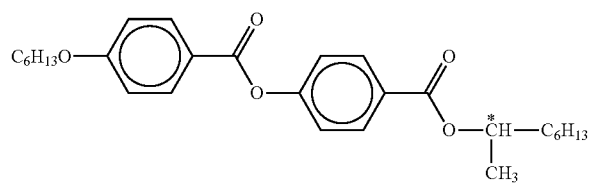
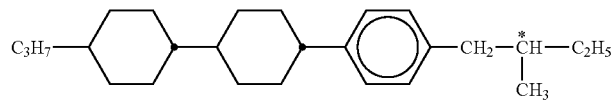
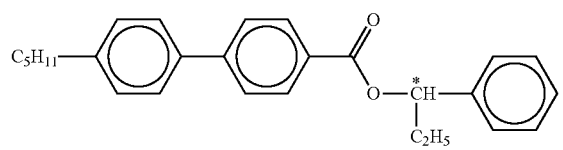
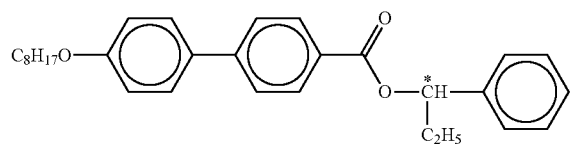
S-811
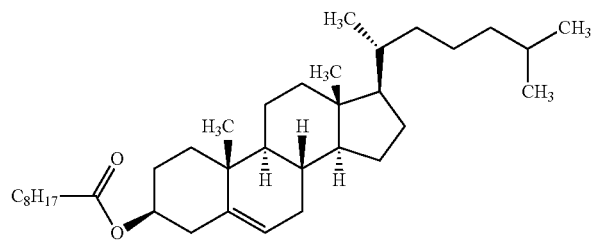
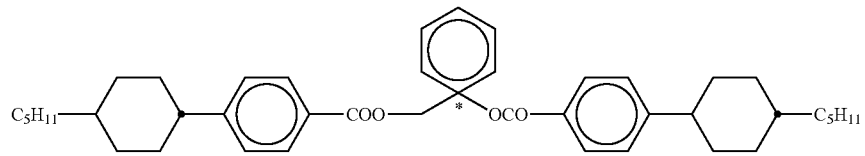
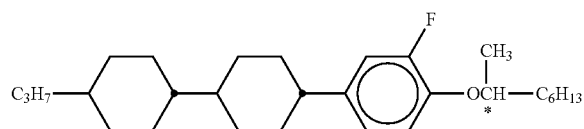
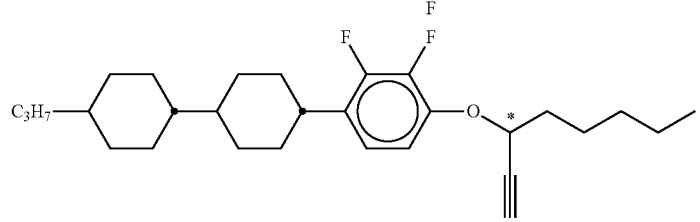
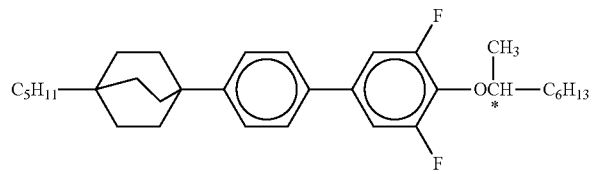

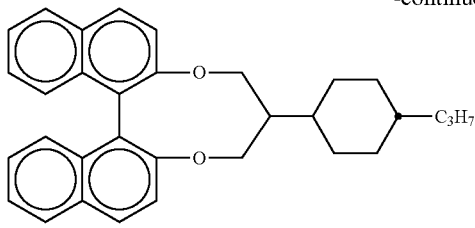

The switching layer S preferably has an average refractive index n, and the molecules have a pitch p, where the product n·p is >0.8 µm, particularly preferably >1.0 µm, very particularly preferably >1.2 µm and is particularly preferably in the range from 50 µm to 0.8 µm, and is very particularly preferably in the range from 25 µm to 0.8 µm.

It is furthermore preferred for the pitch p to be between 0.5 µm and 50 µm, particularly preferably between 0.5 µm and 30 µm, and very particularly preferably between 0.5 µm and 15 µm. p is most preferably between 1 µm and 5 µm. It has been found that low switching voltages can thus be achieved. Low switching voltages are advantageous for switchable windows, inter alia for safety reasons.

The value p can be adjusted by the person skilled in the art through a suitable choice of the chiral dopant and its helical twisting power β and through its concentration.

In a further preferred embodiment, the chiral dopant has a proportion by weight $w_D$ in the liquid-crystalline medium in the range from 0.1% by weight to 30.0% by weight, preferably from 0.1% by weight to 10% by weight.

In a further preferred embodiment of the switching layer S according to the invention which comprises a liquid-crystalline medium having a chiral dopant, use is preferably made of a chiral dopant which has a helical twisting power $\beta = (p \cdot c)^{-1}$ µm$^{-1}$, where p is the pitch of the molecules of the liquid-crystalline medium in µm and c is the concentration of the chiral dopant in % by weight, based on the entire liquid-crystalline medium, and where β is greater than 5 µm$^{-1}$. The chiral dopant preferably has a helical twisting power which is between 5 and 250 µm$^{-1}$, particularly preferably between 7 and 150 µm$^{-1}$.

It is furthermore preferred that the value d/p is >2, where d is the thickness of the switching layer S, and p is the pitch of the molecules of the liquid-crystalline medium. d/p is particularly preferably <20. d/p very particularly preferably has a value between 3 and 10. Suitable values of d/p enable, in particular, highly scattering switching layers S to be obtained, i.e. switching layers S having high values of the diffusive transmission $T_d$.

In a preferred embodiment of the switching layer S according to the invention which comprises a liquid-crystalline medium having a chiral dopant, the switching layer S according to the invention, incorporated into a switching element, can be switched from a state which appears clear to the human eye, in which the molecules of the liquid-crystalline medium are arranged in a homeotropic manner, i.e. are arranged perpendicular to the switching layer planes USLP and LSLP, into a state aligned in polydomains, which appears homogeneously opaque to the human eye. The fact that the polydomain state has structuring under the microscope has no adverse effect on the property of being visually homogeneously opaque.

In general, the liquid-crystalline medium preferably has a clearing point of >90° C., more preferably >100° C. or >105° C. and very particularly preferably >110° C.

Furthermore, the liquid-crystalline medium of the switching layer S according to the invention generally preferably has a specific resistance of >1.0·10$^9$ ohm·cm, particularly preferably >1.0·10$^{11}$ ohm·cm.

It is furthermore preferred that the switching layer S according to the invention comprises at least one dichroic dye in a dye concentration in the range from 0.01% by weight to 25% by weight, particularly preferably in the range from 0.1% by weight to 15% by weight, based on the weight of the liquid-crystalline medium.

However, preference is also given under certain conditions to embodiments in which the switching layer S does not comprise any dyes. This has the advantage of a simpler structure of the switching element and higher transmission in the light state. Furthermore, the optical appearance of the switching element in this case is white, i.e. uncoloured, which is desirable for certain applications, and the lifetime of the switching element at high temperatures and with light irradiation is preferably longer.

For the purposes of the present application, the term "dichroic dye" is taken to mean a light-absorbent compound where the absorption properties are dependent on the orientation of the molecules relative to the direction of polarisation of the light. A dichroic dye in accordance with the present application typically has an elongate shape, i.e. the dye molecules are significantly longer in one spatial direction (longitudinal axis) than in the other two spatial directions.

The switching layer according to the invention preferably comprises 2, 3 or 4, particularly preferably 3 dichroic dyes, where the absorption spectra of the dichroic dyes preferably complement one another in such a way that the impression of a black colour arises for the human eye.

The dye compounds are preferably selected from azo compounds, anthraquinones, methine compounds, azomethine compounds, merocyanine compounds, naphthoquinones, tetrazines, rylenes, benzothiadiazoles, pyrromethenes, diketopyrrolopyrroles, thienothiadiazoles and malononitriles. Of these, particular preference is given to azo compounds, anthraquinones, rylenes, in particular as disclosed in WO 2014/090373, benzothiadiazoles, in particular as disclosed in WO 2014/187529, diketopyrrolopyrroles, in particular as disclosed in the as yet unpublished application EP 13005918.1, thienothiadiazoles, in particular as disclosed in the as yet unpublished application EP 14002950.5, and malononitriles, in particular as disclosed in the as yet unpublished application EP 14004145.0.

Particular preference is given to the use of the following dyes, whose structures are depicted below:

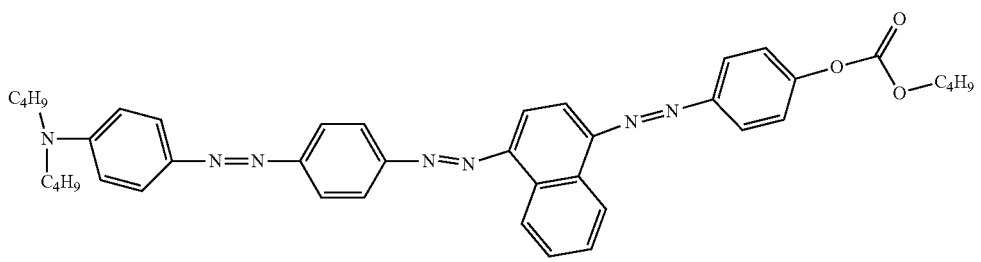
D1
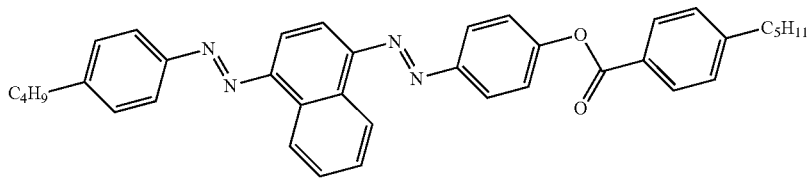
D2
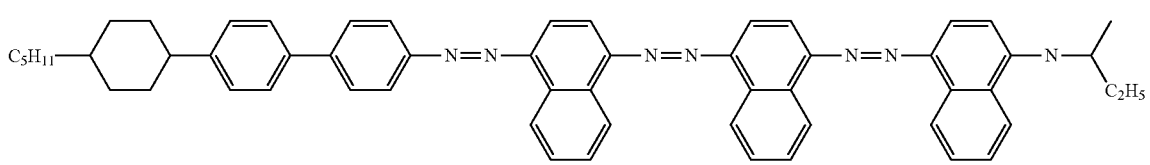
D3
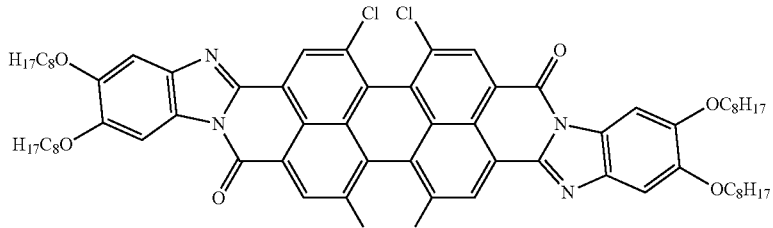
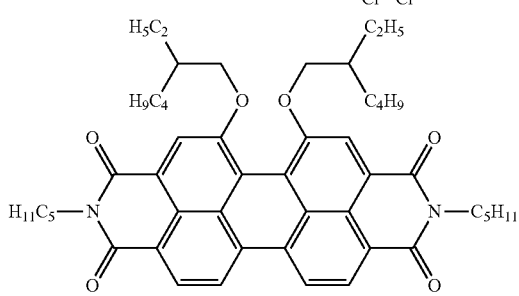
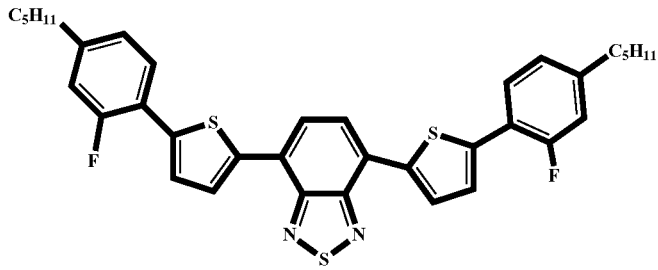
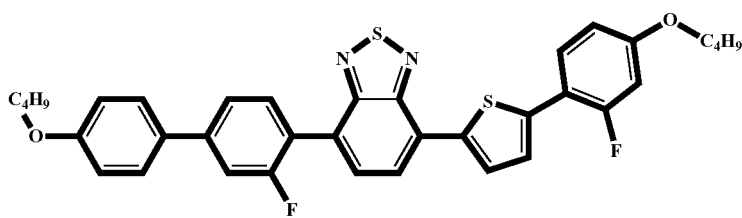

The above-mentioned preferred embodiments comprising at least one dichroic dye are preferred, in particular, if the liquid-crystalline medium of the switching layer S according to the invention does not comprise a polymer component, but instead comprises small molecules and a chiral dopant.

The switching layer S according to the invention preferably has a thickness in the range from 1 µm to 300 µm, particularly preferably in the range from 3 µm to 100 µm, very particularly preferably in the range 20-100 µm. This applies to the case in which the switching element according to the invention has precisely one switching layer S. If the switching element has a plurality of switching layers S which are arranged one behind the other, the sum of the thicknesses of these layers is preferably 5-200 µm, particularly preferably 10-100 µm.

In a further preferred embodiment, the switching layer S according to the invention has a thickness in the range from 3 µm to 200 µm, preferably a thickness in the range from 3 to 75 µm, and, in the opaque switching state, the total transmission $T_{total}$ is in the range from 60% to 100% and the diffusive transmission $T_d$ is in the range from 25% to 100% at a wavelength of the light rays of 550 nm.

In a further preferred embodiment, in one of the switching states, the switching layer S according to the invention preferably scatters less than 45%, particularly preferably less than 20%, more preferably less than 10% and very particularly preferably less than 5% of the parallel light rays in the backwards-scattering directions D(>) away from the upper switching layer plane USLP. This low backwards scattering is particularly preferably present in all switching states of the switching layer, in particular also in the scattering switching state of the switching layer.

In a further preferred embodiment, the switching layer S according to the invention has a control range of the total transmission within a total transmission range from 0% to 80%, where the control range is at least 15%.

The switching layer S according to the invention may be present in a multiple switching layer device together with further switching layers comprising a liquid-crystalline medium. The additional switching layers here may be further switching layers S, and/or they may be switching layers which switch from light to dark without having a scattering switching state. Especial preference is given to multiple switching layer devices comprising two, three or four switching layers, particularly preferably those comprising two or three switching layers. Preferably, at least one of these switching layers is a switching layer which does not have a scattering switching state. This switching layer which does not have a scattering switching state can be utilised to make the transmission through the entire switching element and thus the brightness of the entire switching element switchable in that it switches from light to dark.

The present invention furthermore encompasses a switching element which comprises a switching layer S of the type described above, where the switching layer S is arranged in a first layer sequence, and where the first layer sequence comprises, from the outside inwards, an outer substrate layer,
an outer electrically conductive layer,
the switching layer S,
an inner electrically conductive layer and
an inner substrate layer.

The outer and inner substrate layers may consist of glass or of a polymer, in particular of glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

The switching element according to the invention preferably comprises one or more layers which block UV light. In particular, it comprises one or more layers which do not allow the passage of light having a wavelength of less than 350 nm, preferably less than 360 nm, particularly preferably less than 380 nm, or only do so to a very small proportion. It has been found that devices which have a layer of this type can be switched longer in a reproducible manner and with constant properties.

The outer and inner electrically conductive layers may consist of transparent electrically conductive oxides (TCOs), preferably ITO or $SnO_2$:F, or of a thin transparent metal and/or metal oxide layer, for example of silver. The outer and inner electrically conductive layers are preferably provided with electrical connections. The voltage is preferably supplied by a battery, a rechargeable battery, a supercapacitor or an external current source.

In a preferred embodiment of the switching element according to the invention, in the first layer sequence, an outer orientation layer is arranged between the outer electrically conductive layer and the switching layer and an inner orientation layer is arranged between the inner electrically conductive layer and the switching layer.

The outer and inner orientation layers are preferably a polyimide layer. The outer and inner orientation layers particularly preferably have rubbed polyimide on their surface adjacent to the switching layer S according to the invention. Polyimide rubbed in a certain manner known to the person skilled in the art results in a preferential alignment of the molecules of the liquid-crystalline medium in the switching layer S according to the invention in the rubbing direction if the molecules are in a planar arrangement with respect to the outer or inner orientation layer (homogeneous or planar orientation). Alternatively, it is also possible to employ orientation layers which effect a vertical (homeotropic) orientation of the molecules of the liquid-crystalline medium. Orientation layers of this type preferably consist of the material polyimide and are known to the person skilled in the art and are commercially available. Preference is furthermore also given to orientation layers which, after UV exposure of the orientation material, later cause a preferential direction of the LC. Such materials are known under the technical term "photoalignment".

In a further preferred embodiment of the switching element according to the invention, the switching element has a second layer sequence on the outer substrate layer of the first layer sequence and/or on the inner substrate layer of the first layer sequence, where the second layer sequence comprises, from the outside inwards, a substrate layer,
an electrically conductive layer,
a switching layer comprising a liquid-crystalline medium,
an electrically conductive layer and
a substrate layer.

In a preferred embodiment of the second layer sequence mentioned above, an orientation layer is in each case present between the electrically conductive layer and the switching layer.

For preferred embodiments of the substrate layer, electrically conductive layer and orientation layer of the second layer sequence, the same as has already been explained in the description of the corresponding layers of the first layer sequence applies correspondingly. The liquid-crystalline medium of the switching layer of the second layer sequence is preferably not forwards-scattering. Alternatively and likewise preferably, the switching layer of the second layer sequence may be a further switching layer S, i.e. a switching layer which has a scattering state.

In a further preferred embodiment of the switching element according to the invention, the switching element has a third layer sequence on the outer substrate layer of the first layer sequence and/or on the inner substrate layer of the first layer sequence, where the third layer sequence comprises, from the outside inward,
a substrate layer,
an electrically conductive layer,
an orientation layer,
a switching layer comprising a liquid-crystalline medium,
an orientation layer,
an electrically conductive layer,
a substrate layer,
one or more further optional layers, such as, for example, a low E coating,
an optional air layer,
an optional substrate layer,
an electrically conductive layer,
an orientation layer,
a switching layer comprising a liquid-crystalline medium,
an orientation layer,
an electrically conductive layer and
a substrate layer.

For preferred embodiments of the substrate layers, the electrically conductive layers and the orientation layers of the third layer sequence, the same as has already been explained in the description of the corresponding layers of the first layer sequence applies correspondingly. The liquid-crystalline medium of the switching layers of the third layer sequence is preferably not forwards-scattering. Alternatively and likewise preferably, one or both, preferably one, of the switching layers of the second layer sequence may be a switching layer S, i.e. a switching layer which has a scattering state.

The third layer sequence particularly preferably comprises, from the outside inward,
a substrate layer,
an electrically conductive layer,
a switching layer comprising a liquid-crystalline medium,
an electrically conductive layer,
a substrate layer,
an electrically conductive layer,
a switching layer comprising a liquid-crystalline medium,
an electrically conductive layer and
a substrate layer.

In a preferred embodiment of the third layer sequence mentioned above, an orientation layer is in each case present between electrically conductive layer and switching layer.

The liquid-crystalline medium of the switching layer of the second layer sequence or the liquid-crystalline medium of one or both of the switching layers of the third layer sequence preferably comprises at least one dichroic dye in a dye concentration in the range from 0.01% by weight to 25% by weight, based on the weight of the respective liquid-crystalline medium. The liquid-crystalline medium preferably in each case comprises 2, 3 or 4, preferably 3 or more dichroic dyes, where the absorption spectra of the dichroic dyes preferably complement one another in such a way that the impression of a black colour arises for the human eye, and where the dyes D1, D2 and D3 are particularly preferably employed. Under certain conditions, it may be preferred for 4, 5 or 6 different dyes to be present in the liquid-crystalline medium.

Preferred embodiments of the switching element in accordance with the present application comprise the following combinations of switching layers, or the following individual switching layers:
a) switching layer S which comprises no dichroic dyes
b) switching layer S which comprises dichroic dyes
c) two switching layers S, both of which comprise no dichroic dyes
d) switching layer S which comprises no dichroic dyes and switching layer S which comprises dichroic dyes
e) two switching layers S, both of which comprise dichroic dyes
f) switching layer S which comprises no dichroic dyes and switching layer S1
g) switching layer S which comprises no dichroic dyes and two switching layers S1
h) switching layer S which comprises dichroic dyes and switching layer S1
i) switching layer S which comprises dichroic dyes and two switching layers S1
j) two switching layers S, both of which comprise no dichroic dyes and switching layer S1
k) switching layer S which comprises no dichroic dyes and switching layer S which comprises dichroic dyes and switching layer S1
l) two switching layers S, both of which comprise dichroic dyes and switching layer S1
m) two switching layers S, both of which comprise no dichroic dyes and two switching layers S1
n) switching layer S which comprises no dichroic dyes and switching layer S which comprises dichroic dyes and two switching layers S1
o) two switching layers S, both of which comprise dichroic dyes and two switching layers S1,
where switching layer S1 is a switching layer which has no scattering state and switches from a light switching state to a dark switching state.

Switching layer S1 is preferably a switching layer which comprises a liquid-crystalline medium and at least one dichroic dye and which preferably switches in accordance with the guest-host principle, i.e. from a twisted nematic arrangement of the molecules of the liquid-crystalline medium to a homeotropic arrangement. Switching layers of this type are described in detail, in particular, in the applications WO 2014/135240 and WO 2014/180525, the disclosure content of which is explicitly incorporated herein.

Furthermore, the present invention encompasses a window element which includes a switching element of the type described above. For the purposes of the present invention, the term "window element" means a light-transmitting component of a window, i.e. a glass pane of a single- or multi-glazed window, which is preferably part of a building wall. The glass pane has a side facing towards the incident parallel light rays (outside) and a side facing away from the incident parallel light rays (inside). The switching element of the type described above can be arranged on the outside or inside of the window element according to the invention.

However, the switching element according to the invention can be employed not only in a window, but also in the inside of rooms, for example in dividing walls between rooms and elements for separating individual compartments of rooms. In this case, the privacy which is achieved by switching the switching element from scattering to clear can produce a visual barrier between the room parts.

Furthermore, the switching element of the type described above can be installed in a pre-hung facade element, where the pre-hung facade element is arranged in front of the outside of the window. Incident parallel light rays are thereby scattered at a greater separation from an observer who is located in a room adjoining the inside of the window. Due to the greater separation, the probability increases that light scattered at small scattering angles passes by the observer and consequently does not dazzle him.

Measurement Methods

The measurement of the light intensity values used in the present application is carried out in a Perkin Elmer Lambda 1050 UV/VIS/NIR spectrometer with 150 mm integration sphere (Ulbricht sphere). The transmission intensity values were in each case determined averaged over the spectral range from 380 to 780 nm. "Averaged" here is taken to mean numerically averaged.

For measurement of the transmission intensity of the large-angle scattering $I_{\geq 2.5°}$, the sample is mounted directly on the sample holder of the integration sphere. The integration sphere is open. Exiting light is collected in a light trap, i.e. in a non-reflective black medium, for example in a black, non-reflective cloth, so that light having an aperture angle of less than 2.5° leaves the sphere and is no longer included in the measurement.

The actual integration sphere aperture angle present in the measurements is 4.8°, so that, in the experiments carried out, a $T_D$ for large-angle scattering of at least 4.8° and not a $T_D$ for large-angle scattering of at least 2.5° was determined. The $T_D$ for large-angle scattering of at least 2.5° in accordance with the claims should therefore be set somewhat larger, but at least equally as large as the $T_D$ for large-angle scattering of at least 4.8° measured in the examples.

For measurement of the intensity of the total transmission $I_{tot}$, the sample is mounted directly on the sample holder at the entrance to the integration sphere. The integration sphere (Ulbricht sphere) is closed and directs all light which passes through the sample, i.e. both unscattered and scattered light, to the detector.

A transmission intensity $I_{observer}$ can be calculated from the two above-mentioned values $I_{\geq 2.5°}$ and $I_{tot}$ in accordance with equation (1):

$$I_{observer} = I_{tot} - I_{\geq 2.5°} \quad \text{Equation (1)}$$

For measurement of the backwards-scattering intensity, the sample is mounted at the opened exit aperture of the integration sphere. A light trap is located in the further light path behind the sample. The sample or samples is (are) provided with cable contacts and supplied with a square-wave voltage at the level of the values described. Light reflected by the sample reaches the detector via the integration sphere and is measured. Non-reflected light leaves the integration sphere without reaching the detector.

"Free from scattering" below is intended to mean a value of $T_d$ of less than 3%, preferably less than 1%. Damage in the polyimide caused by spacers and minor damage, for example caused by scratches during rubbing, as a consequence of construction and manufacture means that in practical embodiments a value for $T_d$ of 0% will never be fully achievable.

WORKING EXAMPLES

The present invention is explained in greater detail in the following (comparative) examples.

In the switching layers of the (comparative) examples, base mixtures #1, #2, #3 and #4 having the proportions by weight of their components, i.e. the liquid-crystalline molecules, listed below are employed.

Base mixture #1 has a dielectric anisotropy $\Delta\varepsilon = -5.7$ and consists of
13% by weight of CCN-33,
10% by weight of CZY-3-O2,
10% by weight of CZY-4-O2,
10% by weight of CZY-5-O2,
4% by weight of CCZY-3-O2,
14% by weight of PTY-3-O2,
14% by weight of PTY-5-O2,
5% by weight of CPTY-3-O1,
5% by weight of CPTY-3-O2,
5% by weight of CPTY-3-O3,
8% by weight of CP-3-O1 and
2% by weight of CGPC-3-3.

Base mixture #2 has a dielectric anisotropy $\Delta\varepsilon = +41.8$, a refractive index anisotropy $\Delta n = 0.2574$ and a clearing point of 92° C. and consists of
9% by weight of PZG-2-N,
10% by weight of PZG-3-N,
14% by weight of PZG-4-N,
2% by weight of PZG-5-N,
2% by weight of CP-3-N,
20% by weight of PPTUI-3-2,
28% by weight of PPTUI-3-4 and
3% by weight of CGPC-3-3.

Base mixture #3 has a dielectric anisotropy $\Delta\varepsilon = +11.3$, a refractive index anisotropy $\Delta n = 0.1349$ and a clearing point of 114.5° C. and consists of
16% by weight of CP-3-N,
16% by weight of CP-5-N,
5% by weight of CPG-3-F,
5% by weight of CPG-5-F,
15% by weight of CPU-3-F,
15% by weight of CPU-5-F,
7% by weight of CCGU-3-F,
4% by weight of CGPC-3-3,
4% by weight of CGPC-5-3,
4% by weight of CGPC-5-5,
3% by weight of CCZPC-3-3,
3% by weight of CCZPC-3-4 and
3% by weight of CCZPC-3-5.

Base mixture #4 has a dielectric anisotropy $\Delta\varepsilon = -5.0$, a refractive index anisotropy $\Delta n = 0.1531$ and a clearing point of 81° C. and consists of
25% by weight of CY-3-O4,
9% by weight of CY-5-O2,
7% by weight of CCY-3-O2,
4.5% by weight of CCY-3-O3,
10% by weight of CPY-2-O2,
10% by weight of CPY-3-O2,
15% by weight of PYP-2-3,
10% by weight of PYP-2-4,
3% by weight of CCP-V-1,
2% by weight of CPP-3-2,
3.5% by weight of PP-1-2V1,
2% by weight of PGP-2-3,
3.5% by weight of PP-1-2V1 and
2% by weight of PGP-2-3.

The chemical structures of the components of base mixtures #2 and #3 have already been indicated explicitly. The chemical structures of the components of base mixtures #1 and #4 are indicated in the form of abbreviations, the meaning of which is described in WO 2012/052100 from page 3, line 24, to page 67, line 12.

Comparative Example 1

A comparative switching element 1 having the layer sequence shown is produced.

Glass substrate layer 1
Electrically conductive ITO layer 2
Polyimide orientation layer 3
Switching layer 4 consisting of
99.609% by weight of base mixture #3 and
0.391% by weight of dichroic dyes D1, D2 and D3, i.e.
    0.077% by weight of D1,
    0.146% by weight of D2 and
    0.168% by weight of D3
Polyimide orientation layer 5a
Electrically conductive ITO layer 5b
Glass substrate layer 5c
Optional glass substrate layer 5d
Electrically conductive ITO layer 5e
Rubbed polyimide orientation layer 6
Switching layer 7 with identical composition to switching layer 4
Rubbed polyimide orientation layer 8
Electrically conductive ITO layer 9
Glass substrate layer 10

Orientation layers 3 and 6 and orientation layers 5a and 8 align the liquid-crystalline molecules in the same direction, where orientation layer 5a is rotated by 90° relative to orientation layer 3, and orientation layer 8 is rotated by 90° relative to orientation layer 6.

Switching layers 4 and 7 each have a thickness of 24.5 µm. The orientation axes of the liquid-crystalline molecules present in switching layers 4 and 7 lie
- in the switched-off state (U=0 V), planar with a small pre-tilt angle, for example with a pre-tilt angle of 1°, pointing out of the respective switching layer plane and parallel to the respective rubbing directions of the respective adjacent orientation layers, and
- in the switched-on state (U=20 V), perpendicular to the respective orientation layer.

Comparative switching element 1 has a transmission intensity in the "light" switching state of 73% at a voltage of 20 V at the electrodes of switching layers 4 and 7. The liquid-crystalline molecules in switching layers 4 and 7 are in a homeotropic orientation here.

Comparative switching element 1 has a transmission intensity $I_{observer}$ in the "dark" switching state of 15% at a voltage of 0 V at the electrodes of switching layers 4 and 7. The liquid-crystalline molecules in switching layers 4 and 7 are in a planar orientation here.

Comparative switching element 1 is free from scattering (<1%) in both light and dark switching states and the intermediate states.

Comparative Example 2

A comparative switching element 2 having the layer sequence depicted diagrammatically below is produced.

Glass substrate layer 11
Electrically conductive ITO layer 12
Polyimide orientation layer 13
Switching layer 14 consisting of
99.218% by weight of base mixture #3 and
0.782% by weight of dichroic dyes D1, D2 and D3, i.e.
    0.154% by weight of D1,
    0.292% by weight of D2 and
    0.336% by weight of D3
Polyimide orientation layer 15
Electrically conductive ITO layer 16
Glass substrate layer 17

Orientation layer 13 is rotated by 90° relative to orientation layer 15. Switching layer 14 has a thickness of 24.5 µm. The orientation axes of the molecules present in switching layer 14 lie
- in the switched-off state (U=0 V), planar with a small pre-tilt angle, for example with a pre-tilt angle of 1°, pointing out of switching layer plane 14 and parallel to the rubbing directions of orientation layers 13 and 15,
- in the switched-on state (U=20 V), perpendicular to orientation layers 13 and 15.

Comparative switching element 2 has a transmission intensity in the "light" switching state of 73% at a voltage of 20 V at the electrodes of switching layer 14. The liquid-crystalline molecules in switching layer 14 are in a homeotropic orientation here.

Comparative switching element 2 has a measured transmission intensity $I_{observer}$ in the "dark" switching state of 42% at a voltage of 0 V at the electrodes of switching layer 14. The molecules in switching layer 14 are in a planar orientation here.

Comparative switching element 2 is free from scattering (<1%) in both light and dark switching states and the intermediate states.

Comparative Example 3

A comparative switching element 3 having the layer sequence depicted diagrammatically below is produced.

Glass substrate layer 11
Electrically conductive ITO layer 12
Rubbed planar-orienting polyimide orientation layer 13' having a pre-tilt angle of 5°
Switching layer 14' consisting of
95.23% by weight of base mixture #3,
3.91% by weight of dichroic dyes D1, D2 and D3, i.e.
0.77% by weight of D1, 1.46% by weight of D2 and 1.68% by weight of D3,
0.86% by weight of chiral dopant S-811
Rubbed planar-orienting polyimide orientation layer 15' having a pre-tilt angle of 5°, where the rubbing direction runs at an angle of 240° to the rubbing direction of orientation layer 13'
Electrically conductive ITO layer 16
Glass substrate layer 17

Switching layer 14' has a thickness of 5 µm. The orientation axes of the liquid-crystalline molecules present in switching layer 14' lie
- in the switched-off state (U=0 V), planar with a pre-tilt angle of 5° pointing out of switching-layer plane 14' and parallel to the rubbing directions of orientation layers 13' and 15',
- in the switched-on state (U=12 V), perpendicular to orientation layers 13' and 14'.

Comparative switching element 3 has a transmission intensity in the "light" switching state of 74%. The liquid-crystalline molecules in switching layer 14' are in a homeotropic orientation here.

Comparative switching element 3 has a transmission intensity $I_{observer}$ in the "dark" switching state of 22%. The liquid-crystalline molecules in switching layer 14' are in a planar orientation here.

Comparative switching element 3 is free from scattering (<1%) in both light and dark switching states and the intermediate states.

Example 1

A switching element 1 according to the invention has the layer sequence depicted diagrammatically below and comprises a switching layer $S_1$ according to the invention in embodiment a), b) or c) shown in Table 1, where "BM #2" and "BM #3" denote base mixture #2 and base mixture #3 respectively,
"S-5011" denotes chiral dopant S-5011,
"Lambda" denotes the estimated reflection wavelength and
"rubbed antiparallel, planar" denotes a planar orientation with small tilt angles, where the orientations in orientation layers 20 and 21 adjacent to switching layer $S_1$ are meant, and where the tilt angles on orientation layers 20 and 21 are rotated by 180° to one another,
"voltage" denotes the switching voltage of switching layer $S_1$ in the clear or opaque state, where "clear" means the "light" switching state and "opaque" means the "dark" switching state, and where, in the "opaque" switching state, the liquid-crystalline molecules of switching layer S, are in a state aligned in polydomains, which has a homogeneous visual appearance, but may have different structuring under the microscope.

Table 1-1 shows switching states and switching voltages in switching element 1 in embodiments a), b) and c), where switching layers S4 and S7 are in the "light" or "dark" state and switching layer S, is in the "clear" or "opaque" state.

TABLE 1

Embodiments of switching layer $S_1$

| | Layer thickness [μm] | Forwards-scattering liquid-crystalline medium | Pitch [μm] | Lambda [nm] | Orientation of the polyimide | Voltage clear [V] | Voltage opaque [V] |
|---|---|---|---|---|---|---|---|
| a) | 7 | 99.28% by weight of BM#2 0.72% by weight of S-5011 | 1.5 | 2070 | homeotropic | 10 | 6 |
| b) | 23 | 99.46% by weight of BM#2 0.54% by weight of S-5011 | 2.0 | 3290 | rubbed antiparallel, planar | 25 | 3 |
| c) | 23 | 99.73% by weight of BM#3 0.27% by weight of S-5011 | 4.0 | 6250 | rubbed antiparallel, planar | 25 | 5 |

TABLE 1-1

Switching states and switching voltages in switching element 1

| | | Switching state in S4 and S7 | Voltage in S4 and S7 | Switching state in $S_1$ | Voltage in $S_1$ |
|---|---|---|---|---|---|
| a) | 1 | light | 12 V | clear | 10 V |
| | 2 | light | 12 V | opaque | 6 V |
| | 3 | dark | 0 V | clear | 10 V |
| | 4 | dark | 0 V | opaque | 6 V |
| b) | 1 | light | 12 V | clear | 25 V |
| | 2 | light | 12 V | opaque | 3 V |
| | 3 | dark | 0 V | clear | 25 V |
| | 4 | dark | 0 V | opaque | 3 V |
| c) | 1 | light | 12 V | clear | 25 V |
| | 2 | light | 12 V | opaque | 5 V |
| | 3 | dark | 0 V | clear | 25 V |
| | 4 | dark | 0 V | opaque | 5 V |

Layer Sequence of Switching Element 1

Glass substrate layer 1
Electrically conductive ITO layer 2
Polyimide orientation layer 3
Switching layer 4 consisting of
99.609% by weight of base mixture #3 and
0.391% by weight of dichroic dyes D1, D2 and D3, i.e.
  0.077% by weight of D1,
  0.146% by weight of D2 and
  0.168% by weight of D3

Polyimide orientation layer 5a
Electrically conductive ITO layer 5b
Glass substrate layer 5c
Optional glass substrate layer 5d
Electrically conductive ITO layer 5e
Rubbed polyimide orientation layer 6
Switching layer 7 with identical composition to switching layer 4
Rubbed polyimide orientation layer 8
Electrically conductive ITO layer 9
Glass substrate layer 10
Glass substrate layer 18
Electrically conductive ITO layer 19
Polyimide orientation layer 20
Switching layer $S_1$ comprising forwards-scattering liquid-crystalline medium in one of embodiments a), b) or c) shown in Table 1
Polyimide orientation layer 21
Electrically conductive ITO layer 22
Glass substrate layer 23

Switching element 1 in embodiment c) has
a transmission intensity in switching state 1 of 78%,
a transmission intensity $I_{observer}$ in switching state 4 of 9% and
a transmission intensity $I_{tot}$ in switching state 4 of 14%.

Switching element 1 is irradiated here with parallel light rays on substrate layer 1.

Thus, in switching element 1 in the switched state of the scattering switching layer, $\{1-(9/14)\}\cdot 100=36\%$ of the light rays are deflected out of their originally parallel direction by scattering of more than 2.5°. In the "opaque" switching state, the molecules of switching layer $S_1$ are in a state aligned in polydomains.

The corresponding investigations were also carried out for versions a) and b) of the switching layer. With small deviations, the same values for the diffusive transmission in the scattering state were measured as for version c) explicitly described above.

Example 2a

A switching element 2a) according to the invention comprises a switching layer $S_{2a}$) according to the invention having a thickness of 24.5 μm in the layer sequence shown:

Glass substrate layer 1
Electrically conductive ITO layer 2
Polyimide orientation layer 3
Switching layer $S_{2a)}$ consisting of
99.34% by weight of base mixture #3
0.27% by weight of chiral dopant S-5011 and -continued 0.39% by weight of dichroic dyes D1, D2 and D3, i.e.
0.077% by weight of D1, 0.146% by weight of D2 and 0.168% by weight of D3
Polyimide orientation layer 5a
Electrically conductive ITO layer 5b
Glass substrate layer 5c
Optional glass substrate layer 5d
Electrically conductive ITO layer 5e
Polyimide orientation layer 6
Switching layer S7 with identical composition to switching layer S4
Polyimide orientation layer 8
Electrically conductive ITO layer 9
Glass substrate layer 10

Table 1-2 shows switching states and switching voltages in switching element 2a, where switching layer S7 is in the "light" or "dark" state and switching layer $S_{2a}$ is in the "light-clear" or "dark-opaque" state.

TABLE 1-2

Switching states and switching voltages in switching element 2a

| | Switching state in S7 | Voltage in S7 | Switching state in $S_{2a}$ | Voltage in $S_{2a}$ |
|---|---|---|---|---|
| 1 | light | 12 V | light-clear | 25 V |
| 2 | dark | 0 V | light-clear | 25 V |
| 3 | light | 12 V | dark-opaque | 5 V |
| 4 | dark | 0 V | dark-opaque | 5 V |

Switching element 2a) is irradiated with parallel light rays on substrate layer 1 and has
 a transmission intensity in switching state 1 of 75%,
 a transmission intensity $I_{observer}$ in switching state 4 of 16%, and
 a transmission intensity $I_{tot}$ in switching state 4 of 28%, measured on the Ulbricht sphere, i.e. with scattered light.
Thus, in switching element 2a in the switched state of the scattering switching layer, $\{1-(16/28)\}\cdot 100 = 43\%$ of the light rays are deflected out of their originally parallel direction by scattering of more than 2.5°. In the "dark-opaque" switching state, the molecules of switching layer $S_{2a}$) are in a state aligned in polydomains.

Example 2b

A switching element 2b) according to the invention comprises a switching layer $S_{2b}$ according to the invention having a thickness of 25 μm in the layer sequence depicted diagrammatically below.
Table 1-3 shows switching states and switching voltages in switching element 2b, where switching layer S4 is in the "light" or "dark" state and switching layer $S_{2b}$ is in the "light-clear" or "dark-opaque" state.

TABLE 1-3

Switching states and switching voltages in switching element 2b

| | Switching state in S4 | Voltage in S4 | Switching state in $S_{2b}$ | Voltage in $S_{2b}$ |
|---|---|---|---|---|
| 1 | light | 12 V | light-clear | 25 V |
| 2 | dark | 0 V | light-clear | 25 V |
| 3 | light | 12 V | dark-opaque | 5 V |
| 4 | dark | 0 V | dark-opaque | 5 V |

Glass substrate layer 1
Electrically conductive ITO layer 2
Polyimide orientation layer 3
Switching layer 4 consisting of
99.609% by weight of base mixture #3 and
0.391% by weight of dichroic dyes D1, D2 and D3, i.e.
0.077% by weight of D1, 0.146% by weight of D2 and 0.168% by weight of D3
Polyimide orientation layer 5a
Electrically conductive ITO layer 5b
Glass substrate layer 5c
Optional glass substrate layer 5d
Electrically conductive ITO layer 5e
PI orientation layer 6
Switching layer $S_{2b)}$ consisting of
99.34% by weight of base mixture #3
0.27% by weight of chiral dopant S-5011 and
0.39% by weight of dichroic dyes D1, D2 and D3, i.e.
0.077% by weight of D1, 0.146% by weight of D2 and 0.168% by weight of D3
PI orientation layer 8
Electrically conductive ITO layer 9
Glass substrate layer 10

Switching element 2b) is irradiated with parallel light rays on substrate layer 1 and has
 a transmission intensity in switching state 1 of 75%,
 a transmission intensity $I_{observer}$ in switching state 4 of 16%, and
 a transmission intensity $I_{tot}$ in switching state 4 of 28%.
Thus, in switching element 2b in the switched state of the scattering switching layer, $\{1-(16/28)\}\cdot 100 = 43\%$ of the light rays are deflected out of their originally parallel direction by scattering of more than 2.5°.
In the "dark-opaque" switching state, the molecules of switching layer $S_{2b}$) are in a state aligned in polydomains.

Example 2c

A switching element 2c) according to the invention comprises two switching layers $S_{2c1}$ and $S_{2c2}$ according to the invention, each having a thickness of 25 μm, in the layer sequence depicted diagrammatically below.

Glass substrate layer 1
Electrically conductive ITO layer 2
Polyimide orientation layer 3
Switching layer $S_{2c1}$ consisting of
99.34% by weight of base mixture #3
0.27% by weight of chiral dopant S-5011 and
0.39% by weight of dichroic dyes D1, D2 and D3, i.e.
0.077% by weight of D1, 0.146% by weight of D2 and 0.168% by weight of D3
Polyimide orientation layer 5
Electrically conductive ITO layer
Glass substrate layer
Optional further glass substrate layer
Electrically conductive ITO layer
Rubbed polyimide orientation layer 6
Switching layer $S_{2c2}$ consisting of
99.34% by weight of base mixture #3
0.27% by weight of chiral dopant S-5011 and
0.39% by weight of dichroic dyes D1, D2 and D3, i.e.
0.077% by weight of D1, 0.146% by weight of D2 and 0.168% by weight of D3
Rubbed polyimide orientation layer 8
Electrically conductive ITO layer 9
Glass substrate layer 10

Switching element 2c) is irradiated with parallel light rays which are incident perpendicularly on substrate layer 1.
The following switching states are switched:
Switching state 1: a voltage of 25 V is present at each of the two switching layers $S_{2c1}$ and $S_{2c2}$. The transmission intensity in this switching state is 76%. Both switching layers are in the "light-clear" state.

Switching state 2: a voltage of 25 V is present at one of switching layers $S_{2c1}$ or $S_{2c2}$ and a voltage of 5 V is present at the remaining switching layer $S_{2c1}$ or $S_{2c2}$. The transmission intensity in this switching state is 27% without scattered light. In this state, one of the two switching layers is in the "light-clear" state and the other is in the "dark-opaque" state.

Switching state 3: a voltage of 5 V is present at each of the two switching layers $S_{2c1}$ and $S_{2c2}$. The transmission intensity $I_{observer}$ in this switching state is 11%. Both switching layers are in the "dark-opaque" state.

For switching state 3, an $I_{tot}$ of 16% is measured.

Thus, in switching element 2c in the switched state of the scattering switching layer, $\{1-(11/16)\}\cdot 100=31\%$ of the light rays are deflected out of their originally parallel direction by scattering of more than 2.5°.

In the "dark-opaque" switching state, the molecules of switching layers $S_{2c1}$ and $S_{2c2}$ are in a state aligned in polydomains.

Example 2d

A switching element 2d) according to the invention comprises two switching layers $S_{2d1}$ and $S_{2d2}$ according to the invention, each having a thickness of 25 μm, in the layer sequence depicted diagrammatically below.

> Glass substrate layer 1
> Electrically conductive ITO layer 2
> Polyimide orientation layer 3
> Switching layer $S_{2d1}$ consisting of
> 99.73% by weight of base mixture #3
> 0.27% by weight of chiral dopant S-5011
> Polyimide orientation layer 5
> Electrically conductive ITO layer
> Glass substrate layer
> Optional further glass substrate layer
> Electrically conductive ITO layer
> Rubbed polyimide orientation layer 6

-continued

> Switching layer $S_{2d2}$ consisting of
> 99.73% by weight of base mixture #3
> 0.27% by weight of chiral dopant S-5011
> Rubbed polyimide orientation layer 8
> Electrically conductive ITO layer 9
> Glass substrate layer 10

Switching element 2d) is irradiated with parallel light rays which are incident perpendicularly on substrate layer 1.

Switching state 1: a voltage of 25 V is present at each of the two switching layers $S_{2d1}$ and $S_{2d2}$. The transmission intensity in this switching state is 79%. Both switching layers are in the "clear" state.

Switching state 2: a voltage of 5 V is present at each of the two switching layers $S_{2d1}$ and $S_{2d2}$. The transmission intensity $I_{observer}$ in this switching state is 59%. Both switching layers are in the "opaque" state.

For switching state 3, an $I_{tot}$ of 79% is measured.

Thus, in switching element 2d in the switched state of the scattering switching layer, $\{1-(59/79)\}\cdot 100=25\%$ of the light rays are deflected out of their originally parallel direction by scattering of more than 2.5°. In the "opaque" switching state, the molecules of switching layers $S_{2d1}$ and $S_{2d2}$ are in a state aligned in polydomains.

Example 3

A switching element 3 according to the invention has the layer sequence depicted diagrammatically below and comprises a switching layer $S_3$ according to the invention in embodiments a), b) and c) shown in Table 2, where "BM #2" and "BM #3" denote base mixture #2 and base mixture #3 respectively, "S-5011" denotes chiral dopant S-5011, "Lambda" denotes the estimated reflection wavelength and "rubbed antiparallel, planar" denotes a planar orientation with small tilt angles, where the orientations in orientation layers 20 and 21 adjacent to switching layer $S_3$ are meant, and where the tilt angles on orientation layers 20 and 21 are rotated by 180° to one another, "voltage" denotes the switching voltage of switching layer $S_3$ in the clear or opaque state, where, in the "opaque" switching state, the molecules of switching layer $S_3$ are in a state aligned in polydomains.

Table 1-4 shows switching states and switching voltages in switching element 3 in embodiments a), b) and c), where switching layer 14 is in the "light" or "dark" state and switching layer $S_3$ is in the "clear" or "opaque" state.

TABLE 2

| | Layer thickness [μm] | Forwards-scattering liquid-crystalline medium | Pitch [μm] | Lambda [nm] | Orientation of the polyimide | Voltage clear [V] | Voltage opaque [V] |
|---|---|---|---|---|---|---|---|
| a) | 7 | 99.28% by weight of BM#2 0.72% by weight of S-5011 | 1.5 | 2070 | homeotropic | 10 | 6 |
| b) | 23 | 99.46% by weight of BM#2 0.54% by weight of S-5011 | 2.0 | 3290 | rubbed antiparallel, planar | 23 | 8 |
| c) | 23 | 99.73% by weight of BM#3 0.27% by weight of S-5011 | 4.0 | 6250 | rubbed antiparallel, planar | 25 | 5 |

TABLE 1-4

Switching states and switching voltages in switching element 3

| | | Switching state in S14 | Voltage in S14 | Switching state in $S_3$ | Voltage in $S_3$ |
|---|---|---|---|---|---|
| a) | 1 | light | 12 V | clear | 10 V |
| | 2 | light | 12 V | opaque | 6 V |
| | 3 | dark | 0 V | clear | 10 V |
| | 4 | dark | 0 V | opaque | 6 V |
| b) | 1 | light | 12 V | clear | 23 V |
| | 2 | light | 12 V | opaque | 8 V |

TABLE 1-4-continued

Switching states and switching voltages in switching element 3

|   | | Switching state in S14 | Voltage in S14 | Switching state in $S_3$ | Voltage in $S_3$ |
|---|---|---|---|---|---|
|   | 3 | dark | 0 V | clear | 23 V |
|   | 4 | dark | 0 V | opaque | 8 V |
| c) | 1 | light | 12 V | clear | 25 V |
|   | 2 | light | 12 V | opaque | 5 V |
|   | 3 | dark | 0 V | clear | 25 V |
|   | 4 | dark | 0 V | opaque | 5 V |

Layer Sequence of Switching Element 3

Glass substrate layer 11
Electrically conductive ITO layer 12
Polyimide orientation layer 13
Switching layer 14 consisting of
99.218% by weight of base mixture #3 and
0.782% by weight of dichroic dyes D1, D2 and D3, i.e.
0.154% by weight of D1, 0.292% by weight of D2 and 0.336% by weight of D3
Polyimide orientation layer 15
Electrically conductive ITO layer 16
Glass substrate layer 17
Optional glass substrate layer 18
Electrically conductive ITO layer 19
Polyimide orientation layer 20
Switching layer $S_3$ comprising liquid-crystalline medium in one of embodiments a), b) or c) shown in Table 2
Polyimide orientation layer 21
Electrically conductive ITO layer 22
Glass substrate layer 23

Switching element 3 in embodiment c) has
a transmission intensity in switching state 1 of 74%,
a transmission intensity $I_{observer}$ in switching state 4 of 23% and
a transmission intensity $I_{tot}$ in switching state 4 of 41%.
Switching element 3 is irradiated here with parallel light rays on substrate layer 11.
Thus, in switching element 3 in the switched state of the scattering switching layer, $\{1-(23/41)\}\cdot 100=44\%$ of the light rays are deflected out of their originally parallel direction by scattering of more than 2.5°.
In the "opaque" switching state, the molecules of switching layer $S_3$ are in a state aligned in polydomains.
The corresponding investigations were also carried out for versions a) and b) of the switching layer. With small deviations, the same values for the diffusive transmission in the scattering state were measured as for version c) explicitly described above.

Example 3a

A switching element 3a according to the invention comprises switching layers 14 and S3 according to the invention in the layer sequence depicted diagrammatically below.

Glass substrate layer 11
Electrically conductive ITO layer 12
Polyimide orientation layer 13
Switching layer 14 consisting of
99.34% by weight of base mixture #3
0.27% by weight of chiral dopant S-5011 and
0.39% by weight of dichroic dyes D1, D2 and D3, i.e.
0.077% by weight of D1, 0.146% by weight of D2 and 0.168% by weight of D3
Polyimide orientation layer 15
Electrically conductive ITO layer 16
Glass substrate layer 17
Optional glass substrate layer 18
Electrically conductive ITO layer 19
Polyimide orientation layer 20
Switching layer $S_3$ comprising liquid-crystalline medium in one of embodiments a), b) or c) shown in Table 2 of Example 3
Polyimide orientation layer 21
Electrically conductive ITO layer 22
Glass substrate layer 23

The following switching states are switched:

| | Switching state in S14 | Voltage in S14 | Switching state in $S_3$ | Voltage in $S_3$ |
|---|---|---|---|---|
| 1 | light-clear | 25 V | light-clear | 25 V |
| 2 | dark-opaque | 5 V | light-clear | 25 V |
| 3 | light-clear | 25 V | dark-opaque | 5 V |
| 4 | dark-opaque | 5 V | dark-opaque | 5 V |

Switching element 3a in embodiment c) has
a transmission intensity in switching state 1 of 88%,
a transmission intensity $I_{observer}$ in switching state 4 of 18% and
a transmission intensity $I_{tot}$ in switching state 4 of 53%.
Switching element 3a is irradiated here with parallel light rays on substrate layer 11.
Thus, in switching element 3a in the switched state of the scattering switching layer, $\{1-(18/53)\}\cdot 100=66\%$ of the light rays are deflected out of their originally parallel direction by scattering of more than 2.5°.
In the "dark-opaque" switching state, the molecules of switching layers 14 and $S_3$ are in a state aligned in polydomains.
The corresponding investigations were also carried out for versions a) and b) of the switching layer. With small deviations, the same values for the diffusive transmission in the scattering state were measured as for version c) explicitly described above.

Example 4

A switching element 4 according to the invention comprises a switching layer $S_4$ according to the invention having a thickness of 24.5 μm in the layer sequence depicted below.

Glass substrate layer 11
Electrically conductive ITO layer 12
Polyimide orientation layer 13
Switching layer $S_4$ consisting of
98.95% by weight of base mixture #3,
0.78% by weight of dichroic dyes D1, D2 and D3, i.e.
0.154% by weight of D1, 0.292% by weight of D2 and 0.336% by weight of D3
0.27% by weight of chiral dopant S-5011
Polyimide orientation layer 15
Electrically conductive ITO layer 16
Glass substrate layer 17

Switching element 4 has
a transmission intensity in the "light-clear" switching state of 74% (voltage=25 V),
a transmission intensity $I_{observer}$ in the "dark-opaque" switching state of 15% (voltage=5 V) and
a transmission intensity $I_{tot}$ in the "dark-opaque" switching state of 21%.

Switching element 4 is irradiated here with parallel light rays on substrate layer 11.

Thus, in switching element 4 in the switched state of the scattering switching layer, $\{1-(15/21)\}\cdot 100=29\%$ of the light rays are deflected out of their originally parallel direction by scattering of more than 2.5°.

In the "dark-opaque" switching state, the molecules of switching layer S4 are in a state aligned in polydomains.

Example 4b

A switching element 4b according to the invention comprises a switching layer $S_{4b}$ according to the invention having a thickness of 24.5 μm in the layer sequence depicted below.

Glass substrate layer 11
Electrically conductive ITO layer 12
Polyimide orientation layer 13
Switching layer $S_{4b}$ consisting of
99.73% by weight of base mixture #3,
0.27% by weight of chiral dopant S-5011
Polyimide orientation layer 15
Electrically conductive ITO layer 16
Glass substrate layer 17

Switching element 4b has a transmission intensity in the "clear" switching state of 90% (voltage=25 V), a transmission intensity $I_{observer}$ in the "opaque" switching state of 42% (voltage=5 V) and a transmission intensity $I_{tot}$ in the "opaque" switching state of 90%.

Switching element 4b is irradiated here with parallel light rays on substrate layer 11.

Thus, in switching element 4b in the switched state of the scattering switching layer, $\{1-(42/90)\}\cdot 100=53\%$ of the light rays are deflected out of their originally parallel direction by scattering of more than 2.5°.

In the "opaque" switching state, the molecules of switching layer $S_{4b}$ are in a state aligned in polydomains.

Example 5

A switching element 5 according to the invention comprises a switching layer $S_5$ according to the invention in the following layer sequence:

Glass substrate layer 11
Electrically conductive ITO layer 12
Rubbed planar-orienting polyimide orientation layer 13' having a pre-tilt angle of 5°
Switching layer 14' consisting of
95.23% by weight of base mixture #3,
3.91% by weight of dichroic dyes D1, D2 and D3, i.e.
0.77% by weight of D1, 1.46% by weight of D2 and 1.68% by weight of D3,
0.86% by weight of chiral dopant S-811
Rubbed planar-orienting polyimide orientation layer 15' having a pre-tilt angle of 5°, where the rubbing direction runs at an angle of 240° to the rubbing direction of orientation layer 13'
Electrically conductive ITO layer 16
Glass substrate layer 17
Glass substrate layer 24
Electrically conductive ITO layer
Polyimide orientation layer 25 (rubbed antiparallel, planar) having a small tilt angle
Switching layer $S_5$ consisting of
99.73% by weight of base mixture #3 and
0.27% by weight of chiral dopant S-5011
Polyimide orientation layer 26 (rubbed antiparallel, planar) having a small tilt angle
Electrically conductive ITO layer
Glass substrate layer 27

Switching layer 14' here has a layer thickness of 5 μm. The following switching states are switched:

| | Switching state in S14' | Voltage in S14' | Switching state in $S_5$ | Voltage in $S_5$ |
|---|---|---|---|---|
| 1 | light | 12 V | clear | 25 V |
| 2 | dark | 0 V | clear | 25 V |
| 3 | light | 12 V | opaque | 5 V |
| 4 | dark | 0 V | opaque | 5 V |

Switching element 5 has a transmission intensity in switching state 1 of 74%, a transmission intensity $I_{observer}$ in switching state 4 of 14% and a transmission intensity $I_{tot}$ in switching state 4 of 23%.

Switching element 5 is irradiated here with parallel light rays on substrate layer 11.

Thus, in switching element 5 in the switched state of the scattering switching layer, $\{1-(14/23)\}\cdot 100=39\%$ of the light rays are deflected out of their originally parallel direction by scattering of more than 2.5°.

In the "opaque" switching state, the molecules of switching layer $S_5$ are in a state aligned in polydomains.

Example 6

A switching element 6 according to the invention comprises a switching layer $S_6$ according to the invention having a thickness of 25 μm in the layer sequence depicted diagrammatically below.

Glass substrate layer 28
Electrically conductive ITO layer 29
Homeotropically orienting polyimide orientation layer 30
Switching layer $S_6$ consisting of nematically arranged molecules (component a)) and a polymer component (components b) and c)) with the proportions by weight
a) 83.93% by weight of base mixture #1 ($\Delta\varepsilon = -5.7$)
b) 15.99% by weight of reactive mesogen RM82 and
c) 0.08% by weight of the photoinitiator Irgacure 651
Homeotropically orienting polyimide orientation layer 31
Electrically conductive ITO layer 32
Glass substrate layer 33

For the production of switching layer S6, base mixture #1, reactive mesogen RM82 and the photoinitiator Irgacure 651 are mixed in the above-mentioned weight ratio and photopolymerised for 3 minutes.

Switching element 6 has a transmission intensity in the "clear" switching state of 90%, a transmission intensity $I_{observer}$ in the "opaque" switching state of 45% and a transmission intensity $I_{tot}$ in the "opaque" switching state of 87%.

The switching voltage for the "opaque" switching state is 150 V.

Switching element 6 is irradiated here with parallel light rays on substrate layer 28.

In switching element 6 in the switched state of the scattering switching layer, {1−(45/87)}·100=48% of the light rays are deflected out of their originally parallel direction by scattering of more than 2.5°.

Example 7

A switching element 7 according to the invention comprises a switching layer $S_7$ according to the invention in the layer sequence depicted diagrammatically below.

---
Glass substrate layer 28
Electrically conductive ITO layer 29
Homeotropically orienting polyimide orientation layer 30
Switching layer $S_7$ consisting of nematically arranged molecules (component a)) and a polymer component (components b) and c)) with the proportions by weight
a) 89.70% by weight of base mixture #4
b) 10.00% by weight of reactive mesogen R#1 and
c) 0.30% by weight of the photoinitiator Irgacure 651
Homeotropically orienting polyimide orientation layer 31
Electrically conductive ITO layer 32
Glass substrate layer 33
---

For the production of switching layer $S_7$, base mixture #4 (clearing point: 81° C., optical anisotropy: 0.1531, dielectric anisotropy: −5.0), reactive mesogen R#1 (available from Merck under the name RM82) and the photoinitiator Irgacure 651 are mixed in the above-mentioned weight ratio and photopolymerised for 3 minutes.

Switching element 7 exhibits
a diffusive transmission of 0.3% and backwards scattering of 13% at a voltage of 0 volts and
a diffusive transmission of 75.5% and backwards scattering of 13% at a voltage of 60 volts.

Example 8

A switching element 8 according to the invention comprises a switching layer $S_8$ according to the invention in the layer sequence depicted diagrammatically below.

---
Glass substrate layer 28
Electrically conductive ITO layer 29
Homeotropically orienting polyimide orientation layer 30
Switching layer $S_8$ consisting of nematically arranged molecules (component a)) and a polymer component (components b) and c)) with the proportions by weight
a) 89.70% by weight of base mixture #4
b) 5.0% by weight of reactive mesogen R#1 (diacrylate) and
c) 3.00% by weight of reactive mesogen R#2 (monoacrylate) and
d) 2.00% by weight of reactive mesogen R#3 (monoacrylate) and
e) 0.30% by weight of the photoinitiator Irgacure 651
Polyimide orientation layer 31
Electrically conductive ITO layer 32
Glass substrate layer 33
---

For the production of switching layer $S_8$, base mixture #4 (clearing point: 81° C., optical anisotropy: 0.1531, dielectric anisotropy: −5.0), reactive mesogens R#1, R#2 and R#3 and the photoinitiator Irgacure 651 are mixed in the above-mentioned weight ratio and photopolymerised for 3 minutes.

Switching element 8 exhibits
a diffusive transmission of 1.1% and backwards scattering of 14% at a voltage of 0 volts and
a diffusive transmission of 82.5% and backwards scattering of 13% at a voltage of 50 volts.

Figure 1:
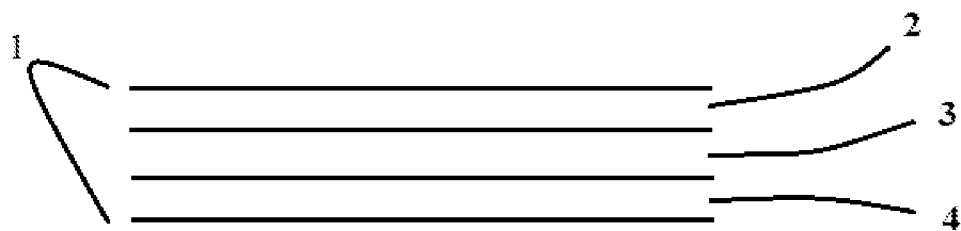
FIG. 1 illustrates a switching layer S (1) containing an upper switching layer plane USLP (2) and a lower switching layer plane LSLP (3), and, arranged between USLP and LSLP, a liquid-crystalline medium (4)
Figure 2:
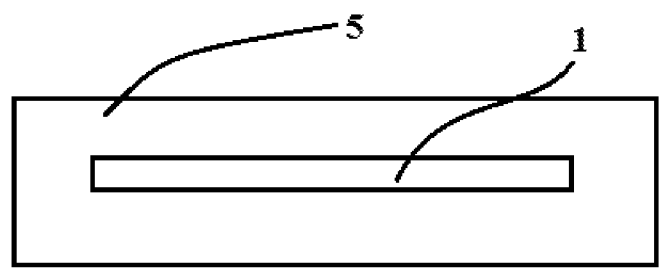
FIG. 2 illustrates a switching element (5) comprising a switching layer S (1)
Figure 3:
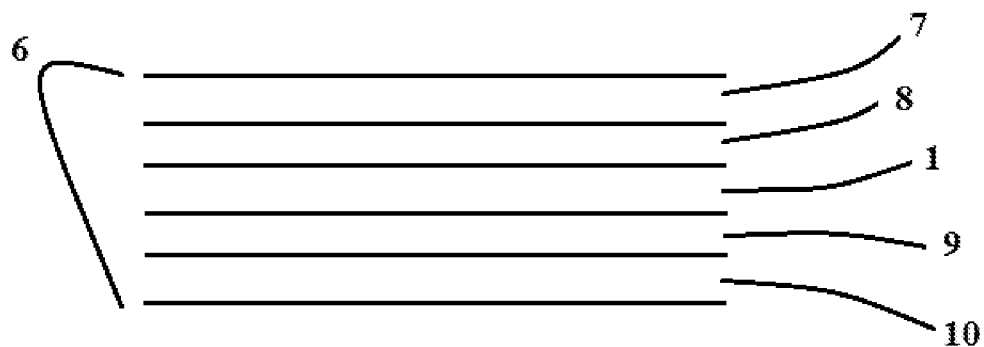
FIG. 3 illustrates a first layer sequence (6) containing from the outside inwards, an outer substrate layer (7), an outer electrically conductive layer (8), the switching layer S (1), an inner electrically conductive layer (9) and an inner substrate layer (10)
Figure 4A:
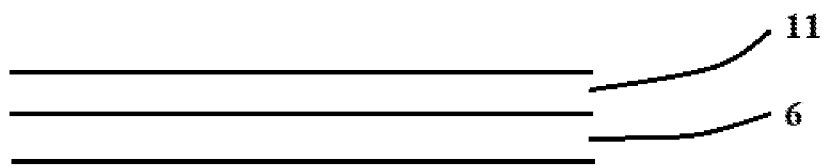
FIG. 4a illustrates a second layer sequence (11) on the outer substrate layer of the first layer sequence (6)
Figure 4B:
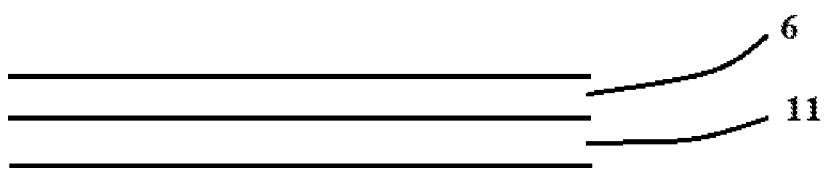
FIG. 4b illustrates a second layer sequence (11) on the inner substrate layer of the first layer sequence (6)
Figure 4C:
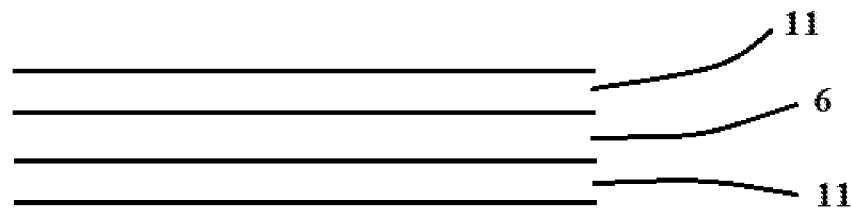
FIG. 4c illustrates a second layer sequence (11) on the outer substrate layer of the first layer sequence (6) and a second layer sequence (11) on the inner substrate layer of the first layer sequence (6)
Figure 5:
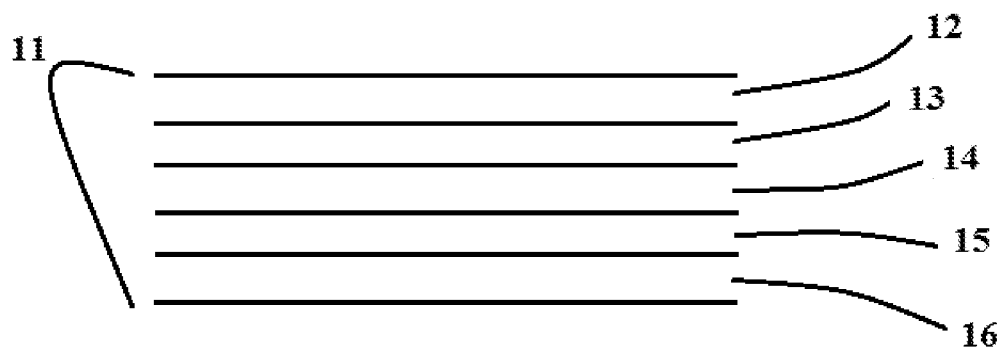
FIG. 5 illustrates a second layer sequence (11) containing from the outside inwards, a substrate layer (12), an electrically conductive layer (13), a switching layer (14) containing a liquid-crystalline medium, an electrically conductive layer (15) and a substrate layer (16)
Figure 6A:
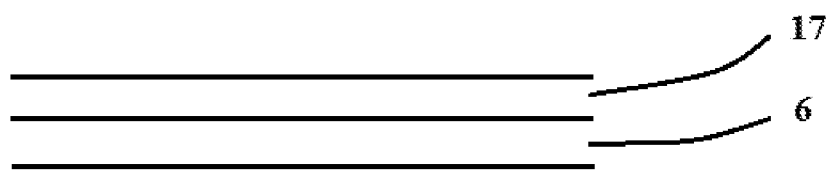
FIG. 6a illustrates a third layer sequence (17) on the outer substrate layer of the first layer sequence (6)
Figure 6B:
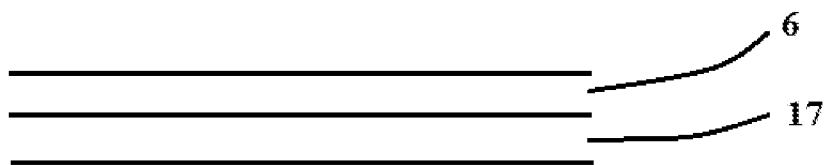
FIG. 6b illustrates a third layer sequence (17) on the inner substrate layer of the first layer sequence (6)
Figure 6C:
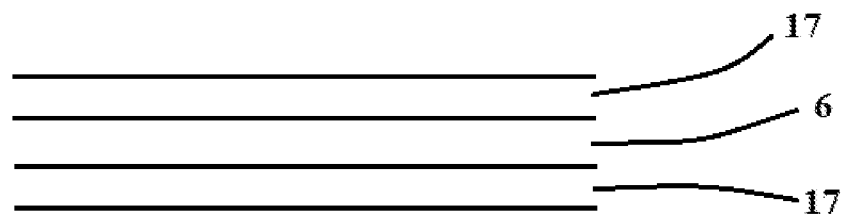
FIG. 6c illustrates a third layer sequence (17) on the outer substrate layer of the first layer sequence (6) and a third layer sequence (17) on the inner substrate layer of the first layer sequence (6)
Figure 7:
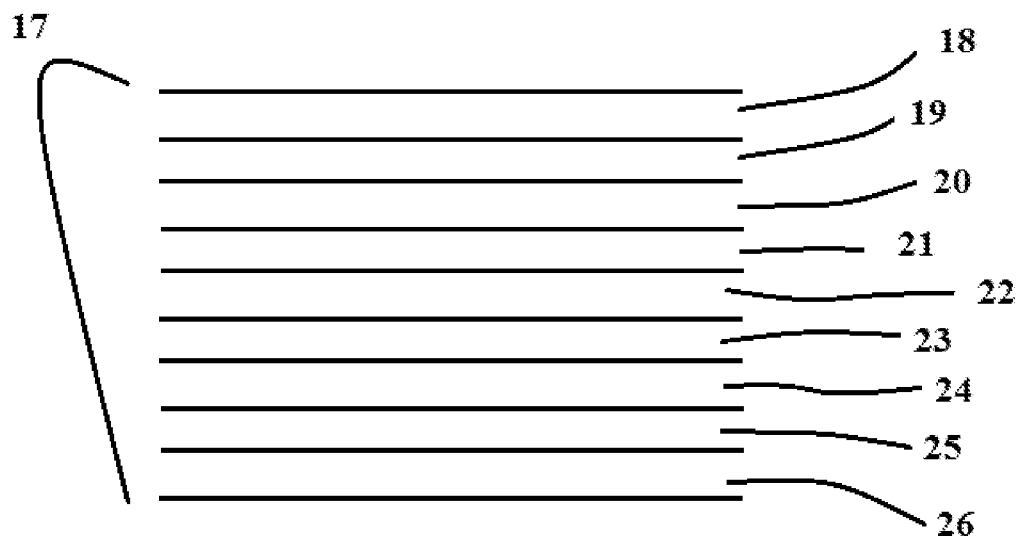
FIG. 7 illustrates a third layer sequence (17) containing, from the outside inwards, a substrate layer (18), an electrically conductive layer (19), a switching layer (20) containing a liquid-crystalline medium, an electrically conductive layer (21), a substrate layer (22), an electrically conductive layer (23), a switching layer (24) containing a liquid-crystalline medium, an electrically conductive layer (25) and a substrate layer (26)
Figure 8:
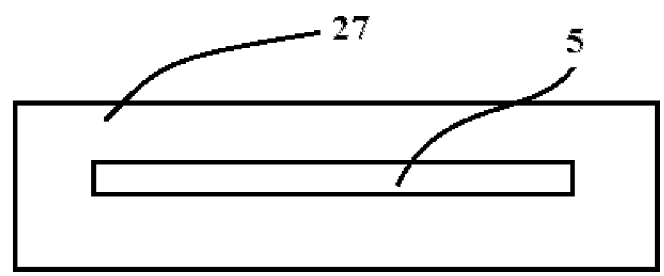
FIG. 8 illustrates a window element (27) which includes a switching element (5)
Figure 9:
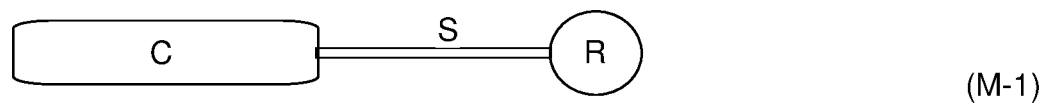
FIG. 9 illustrates the basic structure of formula (M-1) and (M-2)
Figure 9:
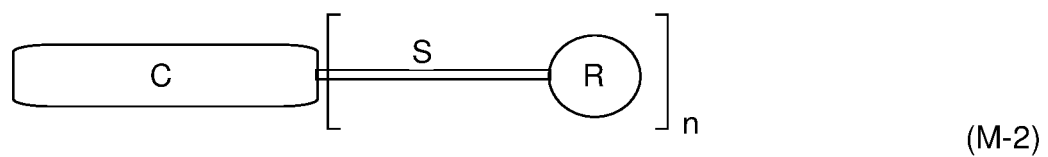
Figure 10:
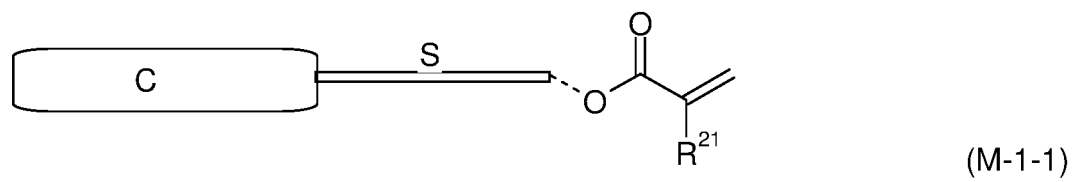
FIG. 10 illustrates formulae (M-1-1) and (M-2-1).
Figure 10:
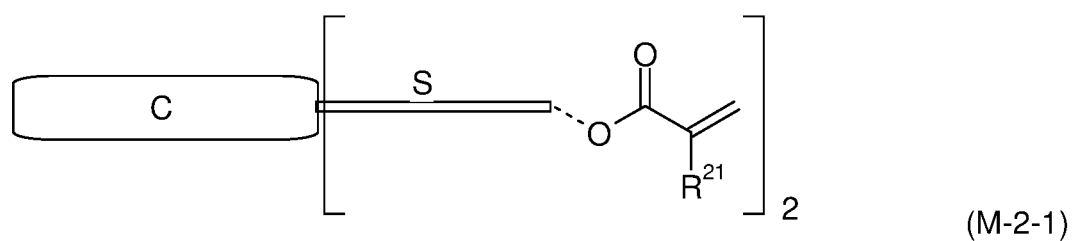

The invention claimed is:

1. A switching layer S for a switching element, where the switching layer S has switching states and comprises
an upper switching layer plane USLP and a lower switching layer plane LSLP, and, arranged between USLP and LSLP,
a liquid-crystalline medium, which comprises a chiral dopant,
where, in one of the switching states, parallel light rays which hit the upper switching layer plane USLP in the directions of incidence D(=) are deflected out of D(=) on passing through the switching layer S, so that, after leaving the lower switching layer plane LSLP, the originally parallel light rays are scattered in the forwards-scattering directions D(<) away from the lower switching layer plane LSLP and are thus scattered forwards, resulting in forwards scattering, which is measured as diffusive transmission $T_d$, where $T_d$ is >20%, and where $T_d$ is defined in accordance with formula (1)

$$T_d = (I_{\geq 2.5°}/I_{tot}) \cdot 100 [\%] \qquad (1)$$

in which $I_{\geq 2.5°}$ denotes the intensity of the large-angle scattering with scattering angles$\geq 2.5°$ and $I_{tot}$ denotes the intensity of the total transmission.

2. The switching layer S according to claim 1, wherein the diffusive transmission $T_d$ in another switching state is <5%.

3. The switching layer S according to claim 1, wherein the liquid-crystalline medium comprises nematically arranged molecules and a polymer component.

4. The switching layer S according to claim 3, wherein the polymer component comprises a polymeric network which is obtained by polymerisation of reactive mesogens.

5. The switching layer S according to claim 4, wherein the nematically arranged molecules and the polymeric network are homogeneously distributed in one another.

6. The switching layer S according to claim 5, wherein the nematically arranged molecules have a proportion by weight $w_{LC}$ and the polymeric network has a proportion by weight $w_{PN}$, and $w_{PN}$, based on a weight $w_{LC}+w_{PN}$, is in the region<60% by weight.

7. The switching layer S according to claim 1, wherein the molecules of the liquid-crystalline medium in the switching state where $T_d$>20% are in a chirally nematic phase.

8. The switching layer S according to claim 7, wherein the chirally nematic phase is a phase aligned in polydomains.

9. The switching layer S according to claim 1, wherein the switching layer S has an average refractive index n, and the molecules of the liquid-crystalline medium have a pitch p, where the product n·p is >0.8 μm.

10. The switching layer S according to claim 1, wherein the chiral dopant has a proportion by weight $w_D$ in the liquid-crystalline medium of 0.1% by weight to 30.0% by weight.

11. The switching layer S according to claim claim 1, the chiral dopant has a helical twisting power $\beta=(p·c)^{-1}$ μm$^{-1}$, where p is the pitch of the molecules of the liquid-crystalline medium in μm and c is the concentration of the chiral dopant in % by weight, based on the entire liquid-crystalline medium, and β is greater than 5 μm$^{-1}$.

12. The switching layer S according to claim 1, wherein the liquid-crystalline medium has a clearing point of >90° C.

13. The switching layer S according to claim 1, which comprises at least one dichroic dye in a dye concentration in the range from 0.01% by weight to 25% by weight, based on the weight of the liquid-crystalline medium.

14. The switching layer S according to claim 1, wherein the switching layer S has a thickness of 3 μm to 200 μm, and, in one switching state, the total transmission $T_{total}$ is between 60% and 100% and the diffusive transmission $T_d$ is between 25% and 100% at a wavelength of the light rays of 550 nm.

15. The switching layer S according to claim 1, wherein, in all its switching states, the switching layer S scatters less than 45% of the parallel light rays in the backwards-scattering directions D(>) away from the upper switching layer plane USLP.

16. A switching element comprising the switching layer S according to claim 1, where the switching layer S is arranged in a first layer sequence, and where the first layer sequence comprises, from the outside inwards, an outer substrate layer,
an outer electrically conductive layer,
the switching layer S,
an inner electrically conductive layer and
an inner substrate layer.

17. The switching element according to claim 16, which comprises one or more layers which block UV light.

18. The switching element according to claim 16, which further comprises a second layer sequence on the outer substrate layer of the first layer sequence and/or on the inner substrate layer of the first layer sequence, where the second layer sequence comprises, from the outside inwards, a substrate layer,
an electrically conductive layer,
a switching layer comprising a liquid-crystalline medium,
an electrically conductive layer and
a substrate layer.

19. The switching element according to claim 16, which further comprises a third layer sequence on the outer substrate layer of the first layer sequence and/or on the inner substrate layer of the first layer sequence, where the third layer sequence comprises, from the outside inwards, a substrate layer,
an electrically conductive layer,
a switching layer comprising a liquid-crystalline medium,
an electrically conductive layer,
a substrate layer,
an electrically conductive layer,
a switching layer comprising a liquid-crystalline medium,
an electrically conductive layer and
a substrate layer.

20. The switching element according to claim 18, wherein the liquid-crystalline medium of the switching layer of the second layer sequence comprises at least one dichroic dye in a dye concentration in the range from 0.01% by weight to 25% by weight, based on the weight of the respective liquid-crystalline medium.

21. A window element which includes the switching element according to claim 16.

22. The switching element according to claim 19, wherein the liquid-crystalline medium of one or both switching layers of the third layer sequence comprises at least one dichroic dye in a dye concentration in the range from 0.01% by weight to 25% by weight, based on the weight of the respective liquid-crystalline medium.

* * * * *